(12) United States Patent
Kumari et al.

(10) Patent No.: US 12,366,632 B2
(45) Date of Patent: Jul. 22, 2025

(54) ASSISTING NODE RADAR ASSISTANCE

(71) Applicant: QUALCOMM Incorporated, San Diego, CA (US)

(72) Inventors: Preeti Kumari, San Diego, CA (US); Kapil Gulati, Belle Mead, NJ (US); Junyi Li, Fairless Hills, PA (US); Anantharaman Balasubramanian, San Diego, CA (US); Shuanshuan Wu, San Diego, CA (US); Navid Abedini, Basking Ridge, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/480,498

(22) Filed: Sep. 21, 2021

(65) Prior Publication Data
US 2023/0093364 A1    Mar. 23, 2023

(51) Int. Cl.
*G01S 7/00* (2006.01)
*G01S 13/75* (2006.01)
*H04B 7/06* (2006.01)
*G01S 13/931* (2020.01)

(52) U.S. Cl.
CPC .............. *G01S 7/006* (2013.01); *G01S 13/75* (2013.01); *H04B 7/0617* (2013.01); *G01S 2013/9316* (2020.01)

(58) Field of Classification Search
CPC .. G01S 7/006; G01S 13/75; G01S 2013/9316; H04B 7/0617
See application file for complete search history.

(56) References Cited

U.S. PATENT DOCUMENTS

| | | | |
|---|---|---|---|
| 2016/0069985 A1* | 3/2016 | Kwakkernaat | G08G 1/04 342/146 |
| 2019/0033439 A1* | 1/2019 | Gu | G01S 7/415 |
| 2020/0037131 A1* | 1/2020 | Hieu Nguyen | H04W 16/28 |
| 2020/0068044 A1* | 2/2020 | Shimizu | H04W 4/46 |
| 2021/0223376 A1* | 7/2021 | Luo | G01S 5/02 |
| 2022/0014935 A1* | 1/2022 | Haija | H04L 5/0048 |
| 2022/0039048 A1* | 2/2022 | Khoryaev | H04W 64/00 |
| 2023/0308139 A1* | 9/2023 | Baligh | H04B 7/04013 |

* cited by examiner

*Primary Examiner* — Vladimir Magloire
*Assistant Examiner* — Nazra Nur Waheed
(74) *Attorney, Agent, or Firm* — Holland & Hart LLP

(57) ABSTRACT

Methods, systems, and devices for wireless communications are described. A user equipment (UE) in a vehicle-to-everything (V2X) system may receive configuration information from an assisting node, such as a roadside unit (RSU), for calculating location information for a target UE in the V2X system. The assisting node may reflect one or more radar signals from the UE towards the target, and from the target back towards the UE according to the configuration information. That is, the assisting node may modify one or more waveform parameters of the reflection according to the configuration information. The UE may calculate location information for the target based on the reflection, such as by classifying the target as non-line-of-sight (NLOS) based on modified waveform parameters, location information of the assisting node, or both.

30 Claims, 17 Drawing Sheets

ASSISTING NODE RADAR ASSISTANCE

FIELD OF TECHNOLOGY

The following relates to wireless communications, including assisting node radar assistance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support assisting node radar assistance. Generally, the described techniques provide for a user equipment (UE) to receive configuration information for calculating location information of a target UE based on a reflection of one or more radar signals. For example, a UE in a vehicle-to-everything (V2X) system may receive configuration information from an assisting node, such as a roadside unit (RSU), for calculating location information for a target UE in the V2X system. The assisting node may reflect one or more radar signals from the UE towards the target, and from the target back towards the UE according to the configuration information. That is, the assisting node may modify one or more waveform parameters of the reflection according to the configuration information. The UE may calculate location information for the target based on the reflection, such as by classifying the target as non-line-of-sight (NLOS) based on modified waveform parameters, location information of the assisting node, or both.

A method for wireless communication at a UE is described. The method may include receiving signaling indicating configuration information associated with a reflection, by an assisting node, of one or more sets of radar signals transmitted from the UE, receiving, via the assisting node, the reflection for the one or more sets of radar signals, and calculating location information for a target associated with the reflection of the one or more sets of radar signals based on the configuration information.

An apparatus for wireless communication at a UE is described. The apparatus may include a processor, memory coupled with the processor, and instructions stored in the memory. The instructions may be executable by the processor to cause the apparatus to receive signaling indicating configuration information associated with a reflection, by an assisting node, of one or more sets of radar signals transmitted from the UE, receive, via the assisting node, the reflection for the one or more sets of radar signals, and calculate location information for a target associated with the reflection of the one or more sets of radar signals based on the configuration information.

Another apparatus for wireless communication at a UE is described. The apparatus may include means for receiving signaling indicating configuration information associated with a reflection, by an assisting node, of one or more sets of radar signals transmitted from the UE, means for receiving, via the assisting node, the reflection for the one or more sets of radar signals, and means for calculating location information for a target associated with the reflection of the one or more sets of radar signals based on the configuration information.

A non-transitory computer-readable medium storing code for wireless communication at a UE is described. The code may include instructions executable by a processor to receive signaling indicating configuration information associated with a reflection, by an assisting node, of one or more sets of radar signals transmitted from the UE, receive, via the assisting node, the reflection for the one or more sets of radar signals, and calculate location information for a target associated with the reflection of the one or more sets of radar signals based on the configuration information.

Some examples of the method, apparatuses, and non-transitory computer-readable medium described herein may further include operations, features, means, or instructions for detecting one or more modified waveform parameters corresponding to the reflection of the one or more sets of radar signals based on the received configuration information and classifying the target as NLOS based on the detected one or more modified waveform parameters.

In some examples of the method, apparatuses, and non-transitory computer-readable medium described herein, the one or more modified waveform parameters including a deterministic slow-time pattern phase, a phase correction, a frequency offset correction, an assisting node reflection signature, or a combination thereof.

Some examples of the method, apparatuses, and non-transitory computer-readable medium described herein may further include operations, features, means, or instructions for determining location information of the assisting node based on receiving the location information of the assisting node, estimating the location information of the assisting node, or both and classifying the target as NLOS based on the location information of the assisting node and a range of the target being greater than a threshold range.

In some examples of the method, apparatuses, and non-transitory computer-readable medium described herein, calculating the location information for the target may include operations, features, means, or instructions for performing a beamforming operation to search for the target.

In some examples of the method, apparatuses, and non-transitory computer-readable medium described herein, calculating the location information for the target may include operations, features, means, or instructions for performing a line-of-sight search to determine a direction of the assisting node, performing a NLOS search according to the configuration information, where the NLOS search includes varying a width of a transmit beam, and estimating a range of the target based on performing the line-of-sight search, the NLOS search, or both.

In some examples of the method, apparatuses, and non-transitory computer-readable medium described herein, the varying the width of the transmit beam includes the UE varying the width of the transmit beam, the assisting node varying the width of the transmit beam, or a combination thereof.

In some examples of the method, apparatuses, and non-transitory computer-readable medium described herein, the configuration information includes a target detection operation schedule corresponding to the one or more sets of radar signals, an azimuth angle associated with the target, an elevation angle associated with the target, a persistence time for a set of multiple target detection operations, calibration information, location information of the assisting node, or a combination thereof.

A method for wireless communication at an assisting node is described. The method may include transmitting, to a UE, signaling indicating configuration information associated with reflections, by the assisting node, of one or more sets of radar signals transmitted from the UE, reflecting the one or more sets of radar signals transmitted from the UE towards a target, and reflecting the reflection of the one or more sets of radar signals from the target towards the UE according to the configuration information.

An apparatus for wireless communication at an assisting node is described. The apparatus may include a processor, memory coupled with the processor, and instructions stored in the memory. The instructions may be executable by the processor to cause the apparatus to transmit, to a UE, signaling indicating configuration information associated with reflections, by the assisting node, of one or more sets of radar signals transmitted from the UE, reflect the one or more sets of radar signals transmitted from the UE towards a target, and reflect the reflection of the one or more sets of radar signals from the target towards the UE according to the configuration information.

Another apparatus for wireless communication at an assisting node is described. The apparatus may include means for transmitting, to a UE, signaling indicating configuration information associated with reflections, by the assisting node, of one or more sets of radar signals transmitted from the UE, means for reflecting the one or more sets of radar signals transmitted from the UE towards a target, and means for reflecting the reflection of the one or more sets of radar signals from the target towards the UE according to the configuration information.

A non-transitory computer-readable medium storing code for wireless communication at an assisting node is described. The code may include instructions executable by a processor to transmit, to a UE, signaling indicating configuration information associated with reflections, by the assisting node, of one or more sets of radar signals transmitted from the UE, reflect the one or more sets of radar signals transmitted from the UE towards a target, and reflect the reflection of the one or more sets of radar signals from the target towards the UE according to the configuration information.

Some examples of the method, apparatuses, and non-transitory computer-readable medium described herein may further include operations, features, means, or instructions for transmitting, to the UE, location information of the assisting node.

In some examples of the method, apparatuses, and non-transitory computer-readable medium described herein, reflecting the reflection may include operations, features, means, or instructions for modifying one or more waveform parameters corresponding to the reflection based on the transmitted configuration information, the one or more modified waveform parameters including a deterministic slow-time pattern phase, a phase correction, a frequency offset correction, an assisting node reflection signature, a programmable weight to apply to the reflection, or a combination thereof.

Some examples of the method, apparatuses, and non-transitory computer-readable medium described herein may further include operations, features, means, or instructions for applying the one or more modified waveform parameters to the reflection per radar signal, per processing interval, or both.

In some examples of the method, apparatuses, and non-transitory computer-readable medium described herein, reflecting the reflection may include operations, features, means, or instructions for transmitting the reflection according to the configuration information.

In some examples of the method, apparatuses, and non-transitory computer-readable medium described herein, reflecting the reflection may include operations, features, means, or instructions for varying a width of a transmit beam associated with the reflection.

In some examples of the method, apparatuses, and non-transitory computer-readable medium described herein, the assisting node includes an intelligent reflective surface, an analog repeater, a digital repeater, or a combination thereof.

In some examples of the method, apparatuses, and non-transitory computer-readable medium described herein, the configuration information includes a target detection operation schedule corresponding to the one or more sets of radar signals, an azimuth angle associated with the target, an elevation angle associated with the target, a persistence time for a set of multiple target detection operations, calibration information, location information of the assisting node, or a combination thereof.

DETAILED DESCRIPTION

In some wireless communications systems, such as a vehicle-to-everything (V2X) system, a user equipment (UE)

may use a radar component to detect targets. For example, the radar component may be a line-of-sight (LOS) sensor that sends radar signaling, which may be reflected off of a target, indicating to the UE the position and velocity of the target. However, an object may block the LOS sensor, which may cause the radar component to inaccurately detect one or more targets. The V2X system may include an assisting node (e.g., a repeater capable of repeating a received signal and transmitting the received signal or a reconfigurable intelligent surface (RIS) capable of reflecting a received signal) for non-LOS (NLOS) target detection. However, a UE may not know how to enable NLOS target detection and parameter estimation.

In some examples, a UE may receive a configuration for enabling NLOS reflection of one or more radar signals from a controller of an assisting node. For example, the UE may receive location information of the assisting node, target detection operation scheduling information and persistence time, calibration information for the assisting node, location or direction information for the target, or a combination thereof. In some cases, the UE may receive the reflection of the one or more radar signals via the assisting node (e.g., via an RIS or directly from a repeater). The UE may determine a location of a target based on the reflected radar signals. For example, the UE may perform a LOS search to determine the direction of the assisting node, a NLOS search according to the configuration information, and may estimate the range of the target based on the NLOS search. In some examples, the UE may determine whether the target is LOS or NLOS based on classifying the target according to the location information and a range of the target being greater than a threshold range. The classification may depend on detecting one or more modified waveform parameters, where the assisting node modifies the parameters according to the configuration.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to assisting node radar assistance.

Figure 1:
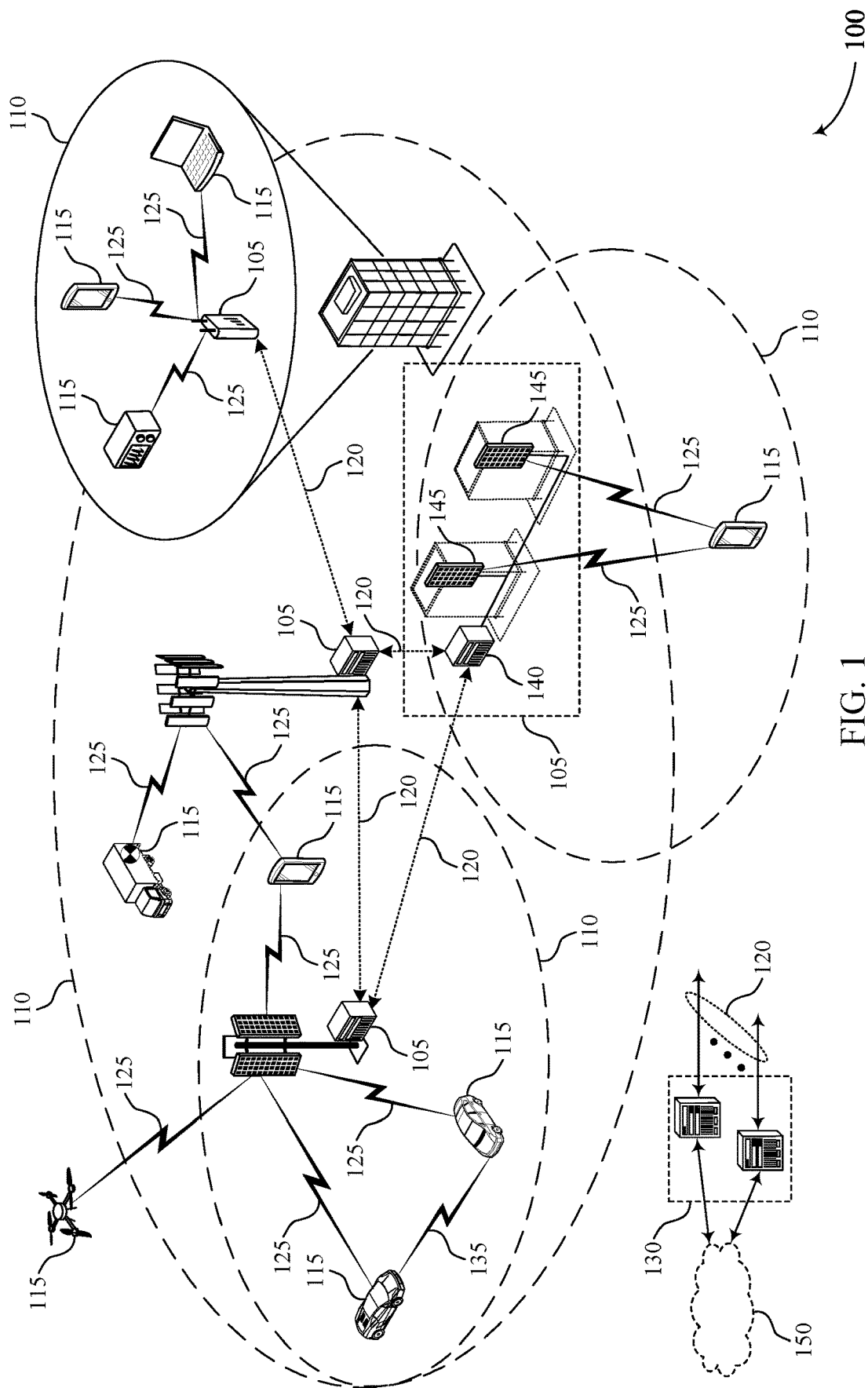
FIGS. 1 through 3 illustrate examples of wireless communications systems that support assisting node radar assistance in accordance with aspects of the present disclosure.

FIG. 1 illustrates an example of a wireless communications system 100 that supports assisting node radar assistance in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may transmit radar signaling within a field of view (FOV) of the UE 115. If a target reflects the radar signaling, the radar component at the UE 115 may receive the reflected chirps after a delay. The UE 115 may use signal processing to calculate the target range, the velocity of the target, and the like. In some examples, a radar component at the UE 115 may be a LOS sensor. For example, a radar component may transmit radar signaling along a direct path, which may be towards a target. In some cases, an object may block the direct path between the radar component and a target. The UE 115 may use a reflective surface to reflect the radar signaling to avoid the object. For example, the V2X system may include an assisting node (e.g., a repeater capable of repeating a received signal and transmitting the received signal or a RIS capable of reflecting a received signal) for NLOS target detection. However, a UE 115 may not know how to enable NLOS target detection and parameter estimation.

In some examples, the wireless communications system 100 may include an assisting node for NLOS target detection by a UE 115. In some cases, the assisting node may have one or more configurable parameters, such that the UE 115 may enable NLOS target detection and parameter estimation. For example, a network may configure one or more parameters at the assisting node or the assisting node may configure the parameters according to a defined configuration (e.g., calibration data, location, programmable weightings, radar waveform parameters, configuration parameters for accurate target detection and location estimation for the assisting node, and the like). The assisting node may send configuration information to one or more UEs 115, such that the UE 115 may calculate a location of one or more targets based on signaling reflected according to the configuration information. For example, the assisting node may reflect signaling from a UE 115 towards a target, and back from the target towards the UE 115. When reflecting the signaling from the target back to the UE 115, the assisting node may operate using the configuration information (e.g., may modify waveform parameters or the like), such that the UE 115 may classify the target as a NLOS target. The UE 115 may calculate the location of the target based on the configuration information and the reflected radar signaling.

Figure 2:
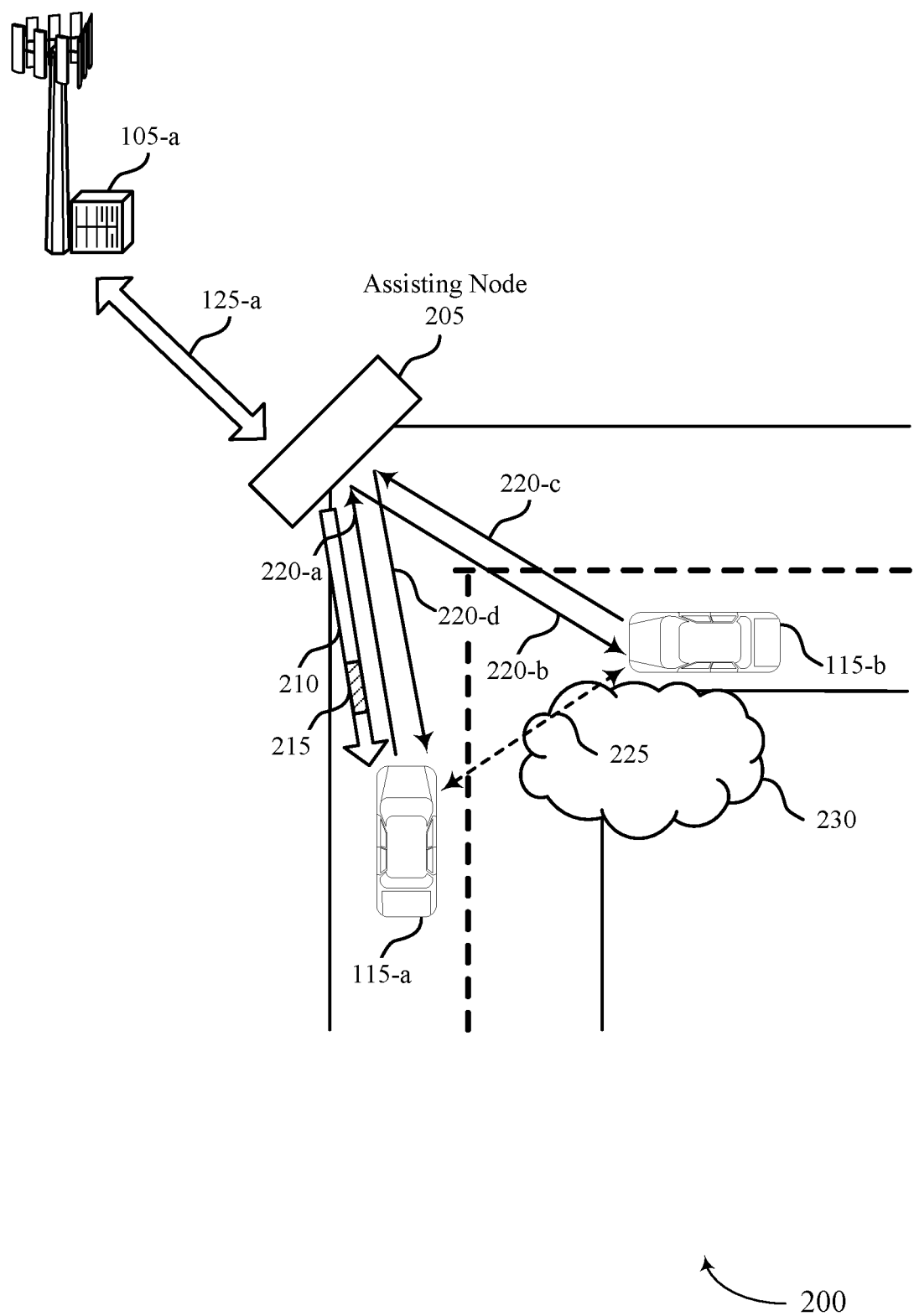

FIG. 2 illustrates an example of a wireless communications system 200 that supports assisting node radar assistance in accordance with aspects of the present disclosure. In some examples, the wireless communications system 200 may implement aspects of the wireless communications system 100. For example, the wireless communications system 200 includes UE 115-a, UE 115-b, base station 105-a, and wireless communications link 125-a, which may be examples of UEs 115, a base station 105, and a wireless communications link 125 as described with reference to FIG. 1. In some examples, an assisting node 205 may communicate with one or more UEs 115, such as UE 115-a, UE 115-b, or both via a downlink communication link 210. For example, an assisting node 205 may relay information from a base station 105 to the UEs 115, may act as a base station 105, or the like. In some cases, an assisting node 205 may transmit configuration information 215 to UE 115-a via downlink communication link 210, such that UE 115-a may calculate location information for a target UE 115 (e.g., UE 115-b).

In some cases, a UE 115 may transmit radar signaling 220 within a FOV of the UE 115. For example, UE 115-a may transmit radar signaling 220 from a respective radar component of UE 115-a. The radar signaling 220 may be Frequency Modulated Continuous Wave (FMCW) or Phase Modulated Continuous Wave (PMCW) signaling, which may support various functionalities, including, for example, target ranging, environmental and object detection, and target tracking among other examples. In some cases, the radar signaling 220 may include a number of "chirps" (e.g., periodic FMCWs sweeping in frequency over a defined frequency range) over multiple transmission frames. Each chirp may be associated with a number of transmission parameters including a slope, a start frequency, a time offset, a chirp duration or period, a frequency offset, a number of frequency chirps within a transmission frame, or any combination thereof.

If a target reflects the chirps, the radar component at UE 115-a may receive the reflected chirps (e.g., the reflected FMCW waveform) after a delay (e.g., a propagation delay). UE 115-a may use signal processing to calculate the target range, the velocity of the target (e.g., by observing a linear rate by which the phase increases per chirp within a transmission frame), and the like over multiple back-to-back transmission frames. Each transmission frame may have a number of range-velocity detections for the time the transmission frame is transmitted, such as one for each target present in a field (e.g., a FOV). A UE 115 may combine successive transmission frame detection results in a time series of detections that may be input to a data-association and track-detection filter. The filter may jointly process the detections across transmission frames and group detections originating from a same target towards creating target "tracks" (e.g., trajectories).

In some examples, a radar component at a UE 115 may be a LOS sensor. For example, a radar component may transmit radar signaling along a direct path 225, which may be towards a target (e.g., another UE 115 or the like). In some cases, the direct path 225 may be blocked by an object 230 between the radar component and a target. For example, if UE 115-a attempts to detect target UE 115-b, an object 230 may block the direct path 225 between UE 115-a and UE 115-b. UE 115-a may use a reflective object to reflect the radar signaling 220 to avoid the object 230. However, multiple reflections of the radar signal 220 may attenuate the radar signal 220. The reflectivity of the surface may depend on an incidence angle, reflected angle, as well as the size, shape, and material of the reflecting surface. If a distance between a UE 115 and a reflecting device, $R_1$, and the reflecting device and a target, $R_2$, is the same (e.g., for $R_1=R_2$), the ratio of received power between the reflection from a direct path 225 and a two-hop NLOS reflection may be determined based on the fraction $$\frac{R_1^4 \pi^2}{\sigma_r^2},$$

where $\sigma_r$ is bistatic radar cross section (RCS) of the reflecting object.

Figure 3:
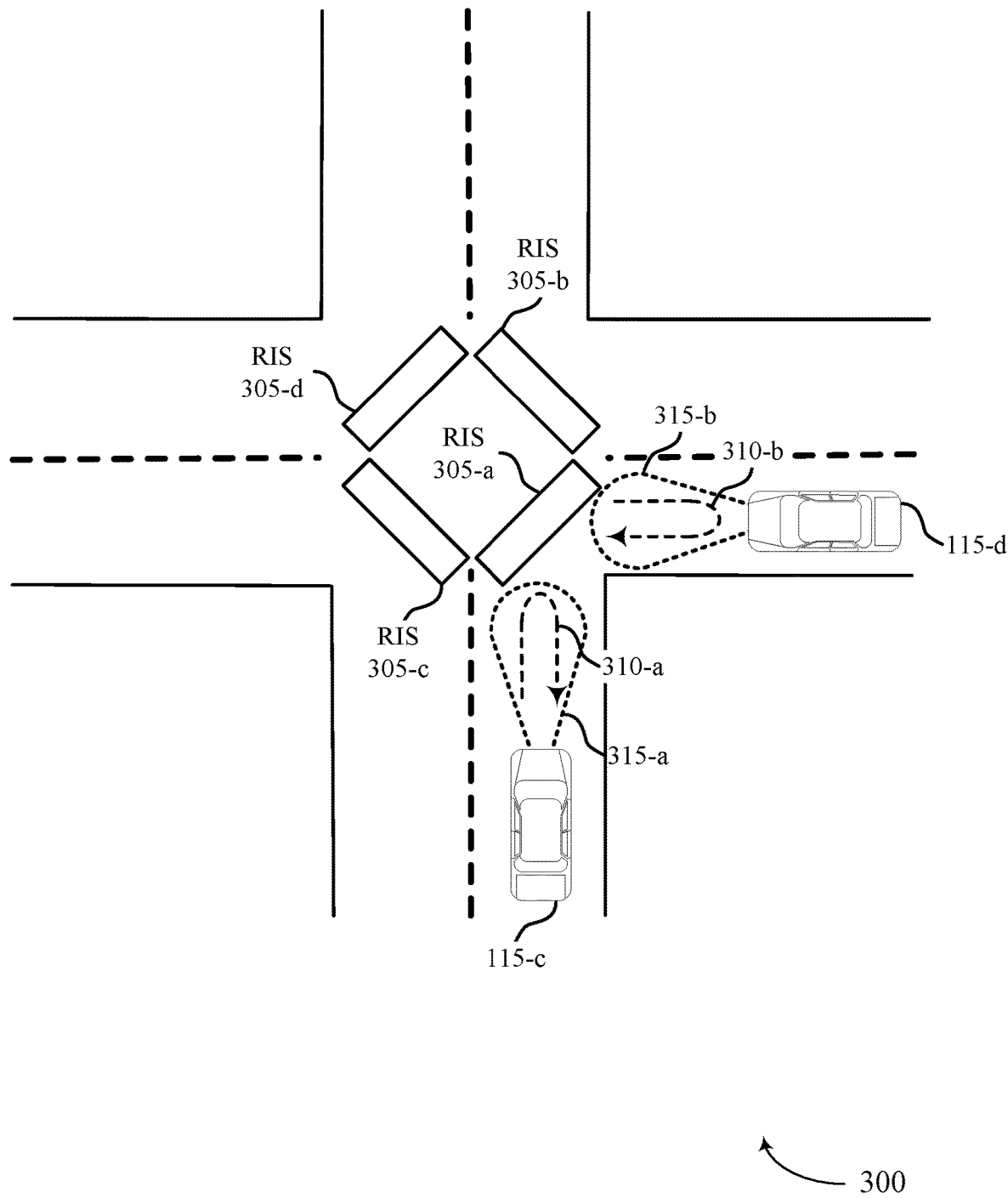

Location information of a NLOS target without the reflector-target angle may be inaccurate, because an estimated angle may be of the last reflector (e.g., may not include information of the reflector-target angle). For a two-hop reflection, which may include a reflection from a UE 115 to a target, and back from the target to the UE 115, as illustrated in FIG. 3, may cause relatively high pathloss. The V2X system may include an assisting node 205 (e.g., a repeater capable of repeating a received signal and transmitting the received signal or a RIS capable of reflecting a received signal) for NLOS target detection. However, a UE 115 may not know how to enable NLOS target detection and parameter estimation.

In some cases, to enable NLOS target detection and parameter estimation, NLOS reflections may not be attenuated or may have relatively small attenuation, and may be transparent (e.g., 0 decibel (dB)) change in signal power. A radar system at a UE 115 may distinguish between NLOS and LOS detections. In some cases, UE 115 may enable estimation of the location of the target by estimating angles (e.g., azimuth and elevation) between the reflector and the knowledge of the location of the last reflector. In some cases, a UE 115 may use a passive repeater to perform NLOS target detection. However, the passive repeater may lose angle information, may use situational awareness or advanced processing to combine with other paths, may be unable to differentiate between NLOS and LOS, and may attenuate the signal (e.g., with a relatively low RCS).

In some examples, a roadside unit (RSU) may be equipped with radar components for radar signaling. The RSU may relay information regarding detected targets to one or more UEs 115, which may provide for the UE 115 to identify NLOS targets. However, equipping the RSU with radar and target detection algorithms may cause relatively high power consumption. Thus, the wireless communications system 200 may include an assisting node 205. In some cases, the assisting node 205 may be a passive device (e.g., a RIS), which may be different from a repeater. For example, the assisting node 205 may not perform power amplification (PA) and low noise amplification (LNA). In some other cases, the assisting node 205 may implement aspects of a repeater. In some examples, the assisting node 205 may have one or more configurable parameters. The assisting node 205 may add a signature to a radar waveform, and may aid in detailed hierarchical beam search and location estimation procedures for NLOS radar sensing.

In some examples, an assisting node 205 may be an example of a RIS, which may also be referred to as a LIS or IRS, a repeater, or both. The assisting node 205 may be a near-passive reflector with relatively low energy consumption. For example, the assisting node 205 may be a man-made surface of electro-magnetic material equipped with integrated electronics that may tune the phase, amplitude, frequency, and polarization of an incoming signal according to a programmable configuration, such as using software-defined meta-surfaces. The RIS may enable configuration of an RCS (e.g., controlled adjustment of an RCS value), such as to a relatively high bistatic RCS. In some cases, the weighting of the RIS may be modified to reflect the incoming signal to a desired target direction with a relatively high bistatic RCS value (e.g., to reduce attenuation of the signal). In some cases, if the assisting node 205 is operating as a repeater, the assisting node 205 may perform transmit and receive beam formation in a desired direction. Further, the assisting node 205 may perform active PA, LNA, or both to boost the transmit power.

In some cases, the assisting node 205 may communicate with a base station 105, which may be an example of an RSU in communication with one or more RISs. For example, the assisting node 205 may communicate with base station 105-a via communication link 125-a. Base station 105-a may send control signaling or data to assisting node 205 for the assisting node 205 to relay to UE 115-a and UE 115-b. In some other cases, the assisting node 205 may operate as a base station 105. The assisting node 205 may transmit configuration information 215 to UE 115-a. The assisting node 205 may relay the configuration information 215 based on a network setting a configuration at the assisting node 205, or the assisting node 205 may set a defined configuration and may transmit the configuration information 215 to UE 115-a (e.g., independent of base station 105-a).

In some examples, a configuration at the assisting node 205 may meet a NLOS target detection and estimation performance condition, where the assisting node 205 may be a man-made programmable near-passive or active device. The assisting node may be a RIS, IRS, LIS, an analog repeater, a digital repeater, or a combination thereof. In some cases, an RSU and UE 115-a may have an active communication channel between them, such as downlink communication link 210 if the assisting node 205 is acting as a relay between the RSU (e.g., base station 105-a) and UE 115-a. Additionally or alternatively, base station 105-a, which may be an example of an RSU, may communicate directly with UE 115-a via a communication link 125. UE 115-a may use V2X communication with an RSU for smart radar assisting node operation. For example, the RSU may assist by allocating resources to the assisting node 205 in retransmitting or reflecting the radar signal 220 from UE 115-a to the NLOS directions.

In some cases, UE 115-a may transmit radar signaling 220-a towards the assisting node 205. The assisting node 205 may reflect the radar signaling 220-a as radar signaling 220-b towards a target UE 115, such as UE 115-b. The target UE 115 may reflect the radar signaling 220-b as radar signaling 220-c back towards the assisting node 205. The assisting node may reflect the reflection of radar signaling 220-c back towards UE 115-a as radar signaling 220-d. In some examples, an RSU may inform one or more radar components at UE 115-a of a scan schedule or a beam direction. The RSU may send the configuration information 215 for the reflections of radar signaling 220 to UE 115-a (e.g., via the assisting node 205 or independent of the assisting node 205).

The configuration information 215 may include calibration data, location, and configuration parameters for accurate target detection and location estimation for the assisting node 205 (e.g., an RIS). The RSU or base station 105-a may control programmable weightings and configurable parameters of the assisting node 205 to reflect or retransmit the impinging radar signaling from UE 115-a, which may be referred to as an ego radar component, in a desirable scan or tracking directions (e.g., to ensure low attenuation and location estimation of the target). An assisting node 205 may modify one or more radar waveform parameters, such as phase coding and frequency offsets, on per-chirp or per-coherent processing interval (CPI) basis to identify assisting node-controlled reflections, retransmissions, or both and to enable NLOS and LOS classification. The NLOS and LOS classification process is described in further detail with respect to FIG. 3.

In some cases, an RSU or base station 105-a may inform UE 115-a, UE 115-b, or both (e.g., one or more vehicle radar components) of a scan schedule or a beam direction, including the azimuth, elevation angle, or both in a NLOS direction. A UE 115 may request the RSU for a persistence time for each scan direction (e.g., to meet a radar performance condition). In some examples, the RSU may control the programmable weightings and configurable parameters of the assisting node 205 to reflect or retransmit the impinging radar signaling 220 in a desirable directions. For example, the RSU may control the weighting of a RIS, or precoder, and amplification of a repeater to perform scanning or tracking in desirable directions communicated by UE 115-*a*.

In some examples, UE 115-*a* may choose to perform a LOS search for one or more targets, such as additional wireless devices, objects, or the like. During the LOS search, one or more radar components at UE 115-*a* may detect and estimate a direction of an assisting node 205 using radar signaling 220. The assisting node 205 may reflect or retransmit the incoming radar signaling 220 in a same direction, enabling monostatic sensing of the assisting node 205. UE 115-*a* may transmit a beam including radar signaling 220-*a* in the estimated location of the assisting node 205. The assisting node 205 may scan the beam in the other directions that are NLOS to UE 115-*a* (e.g., towards UE 115-*b*). For example, the assisting node 205 may scan radar signaling 220-*a* towards UE 115-*b* in radar signaling 220-*b*. UE 115-*a* may vary the transmit bandwidth based on the stage of a hierarchical search. For a first stage, UE 115-*a* may transmit a relatively wider beam and may decrease the beam width for later stages.

In some cases, the assisting node 205 may apply a phase coding or frequency offset to the radar signaling 220, such as to an FMCW waveform on a per-chirp or per-CPI basis, to identify assisting node controlled reflections or retransmissions. For example, the assisting node 205 may use a deterministic slow-time pattern phase, such as by changing phases for each chirp within a CPI. Additionally or alternatively, the assisting node 205 may use a stepped phase code within a CPI to help in frame numbering for radar processing. The RSU or base station 105-*a* may send RIS calibration data, location, configuration parameters, or the like for accurate target detection and parameter estimation in configuration information 215. The RSU may also inform UE 115-*a* of a group delay associated with the assisting node 205, which may be adjusted in a time delay calculation. UE 115-*a* may estimate a range of each target based on the time delay after applying the correction for the assisting node 205 group delay.

In some examples, an RSU may send a global positioning satellite (GPS) location and configuration parameters of an assisting node 205 (e.g., an RIS) for accurate target detection and parameter estimation. UE 115-*a* may use the information to accurately estimate RIS location by either correlating the GPS location information of the RIS with a target detection heatmap at UE 115-*a* or by identifying a RIS reflection signature, such as a phase-coded FMCW with different phase coding for LoS and NLoS. In some cases, the RSU may assist and allocate resources in retransmitting and reflecting the radar signal from UE 115-*a* to the NLOS directions based on a request from UE 115-*a*. The NLOS directions may include directions in which UE 115-*a* may be blind due to objects 230 or other physics conditions. The RSU may perform a fixed scan according to a schedule (e.g., scan Lane N, E, S, W, and repeat).

In some examples, the assisting node 205 may operate according to single frequency full duplex communication. The assisting node may have one or more panels, such as a first panel (Panel 1) that serves a radar component at a UE 115 and a second panel (Panel 2) that scans for targets. Panel 1 may receive a quantity of beams proportional to the number of radar components Panel 1 serves (e.g., 1 or 2 beams). Panel 2 may use a single beam or multiple beams with a capability to beam sweep a FOV range. The assisting node 205 may be bidirectional to reduce a number of panels (e.g., one panel per lane). The bi-directional architecture may cause the scan-side and radar-side to be reversible. Assisting nodes 205 that may be unidirectional may have multiple panels per lane (e.g., 2 panels per lane), such that one panel may scan while another may receive radar signaling 220.

FIG. 3 illustrates an example of a wireless communications system 300 that supports assisting node radar assistance in accordance with aspects of the present disclosure. In some examples, the wireless communications system 300 may implement aspects of the wireless communications systems 100 or wireless communications system 200. For example, a UE 115-*c* operating in the wireless communications system 300, such as a UE 115 as described with reference to FIGS. 1 and 2, may receive configuration information from an assisting node, such as a RIS 305, and may calculate location information for a target UE 115-*d* based on reflections of radar signaling and the configuration information. The wireless communications system 300 may include one or more vehicles (e.g., a UE 115-*c* and a UE 115-*d*) that may travel in various directions or lanes of a roadway.

In some examples, a radar system at UE 115-*c*, UE 115-*d*, or both may distinguish between NLOS and LOS target detections. For example, UE 115-*c* may transmit radar signaling 310-*a* within a FOV 315-*a* of UE 115-*c*. Similarly, UE 115-*d* may transmit radar signaling 310-*b* within a FOV 315-*b* of UE 115-*d*. If a LOS target reflects radar signaling 310-*a*, the radar component at the UE 115 may receive the reflected chirps after a delay. Similarly, if an assisting node, such as RIS 305-*a*, reflects radar signaling 310-*a* towards the target, then reflects the reflection back towards UE 115-*c*, UE 115-*c* may identify the NLOS target. In some cases, a radar component at a UE 115 may classify detected targets into an angle-bin and range-bin based on the angle or range satisfying a threshold, such as being greater than a threshold. The threshold may be associated with an assisting node (e.g., a repeater or RIS 305) and may provide for the UE 115 to identify a target as a NLOS target.

A UE 115, such as UE 115-*c* and UE 115-*d*, may estimate or receive location information for an assisting node, such as RIS 305-*a*, RIS 305-*b*, RIS 305-*c*, RIS 305-*d*, or a combination thereof. For example, UE 115-*c*, UE 115-*d*, or both may request location information from RIS 305-*a*, or may perform a process similar to a target detection process to identify the location of RIS 305-*a* (e.g., through cellular-V2X (C-V2X) communication), where RIS 305-*a* is within LOS of UE 115-*c* and UE 115-*d*. UE 115-*c* may classify a target, such as UE 115-*d*, in an angle-bin for the RIS location as NLOS when a range-bin for a NLOS cluster is greater than a threshold. Additionally or alternatively, UE 115-*d* may classify UE 115-*c* as a target. The threshold may depend on the range-bin for the RIS location. That is, the threshold may be RIS 305 dependent, and may be defined or otherwise configured at the RIS 305. For example, RIS 305-*a* may have a different threshold than RIS 305-*b*, RIS 305-*c*, RIS 305-*d*, or a combination thereof.

In some cases, assisting nodes, such as RIS 305-*a* through RIS 305-*d*, may modify one or more waveform parameters to enable the NLOS and LOS classification at a UE 115. For phase coded FMCW waveforms, the RIS 305 may use a deterministic slow-time pattern to modify the waveform parameters. For example, RIS 305-*a* may change phases for each chirp within a CPI. Additionally or alternatively, the RIS 305 may use a stepped phase code within a CPI for frame numbering, causing improved processing of the radar signaling 310. The radar component for UE 115-c may detect a target based on receiving reflected radar signaling 310-a. For example, UE 115-c may transmit radar signaling 310-a to RIS 305-a. RIS 305-a may reflect the radar signaling 310 towards UE 115-d. UE 115-d may return the radar signaling 310 to the RIS 305-a, and the RIS 305-a may transmit the reflection back towards UE 115-c. For an angle-bin associated with the assisting node, which may be determined based on RSU and UE 115 association, detection, or both, the assisting node or UE 115-c may apply phase-correction followed by the Doppler Fast Fourier Transforms (FFTs) to detect multiple targets in the NLoS directions. For FMCW waveforms with frequency offsets in a slow-time domain, the RIS 305 may use processing with and without frequency offset correction for angle-bins associated with the RIS. UE 115-a may perform NLOS and LOS classification based on the tracking accuracy within a dwell time (e.g., a finite number of CPIs).

In some examples, UE 115-c may estimate location of one or more NLOS targets, such as UE 115-d. UE 115-c may use beamforming strategies for the estimation. For example, UE 115-c may perform a hierarchical or exhaustive search in which the search may be within a given sector related to a LOS FOV of RIS 305-a. The sector size may depend on a layout of the environment around RIS 305-a, which may be known to a base station or RSU either in a static (e.g., map-based) or in a semi-static fashion (e.g., C-V2X communication or event-based). In some other examples, UE 115-c may track within a relatively small sector. In some cases, UE 115-c, UE 115-d, or both may choose to perform a LOS search. During the LOS search, UE 115-c, UE 115-d, or both may detect and estimate the direction of RIS 305-a. For example, the UEs 115 may correlating GPS location information of RIS 305-a (e.g., communicated by a C-V2X communication link) with a detected target heatmap. In some other examples, the UEs 115 may identify a RIS reflection signature for RIS 305-a, such as phase-coded FMCW with different phase coding for LOS and NLOS.

UE 115-c, UE 115-d, or both may search for NLOS targets using RIS 305-a. For example, UE 115-c may transmit a beam in an estimated RIS location, and RIS 305-a may scan the beam in other directions that may be NLOS to UE 115-c. Similarly, UE 115-d may transmit a beam in an estimated RIS location, and RIS 305-a may scan the beam in directions that may be NLOS to UE 115-d. UE 115-c, UE 115-d, or both may vary the transmit beam width based on a stage of the hierarchical search. For a first stage, UE 115-c, UE 115-d, or both may transmit a relatively wide beam and may keep decreasing the beam width for later stages of the hierarchical search. An RSU or base station may inform UE 115-c, UE 115-d, or both of a scan schedule, including the azimuth and elevation angle of the scan. UE 115-c, UE 115-d, or both may request persistence time for each scan direction from the RSU. UE 115-c may estimate a range of each target, such as UE 115-d, based on a time delay. In some cases, the RSU may inform UE 115-c, UE 115-d, or both of a group delay associated with the assisting nodes (e.g., to be adjusted in time delay calculation).

Figure 4:
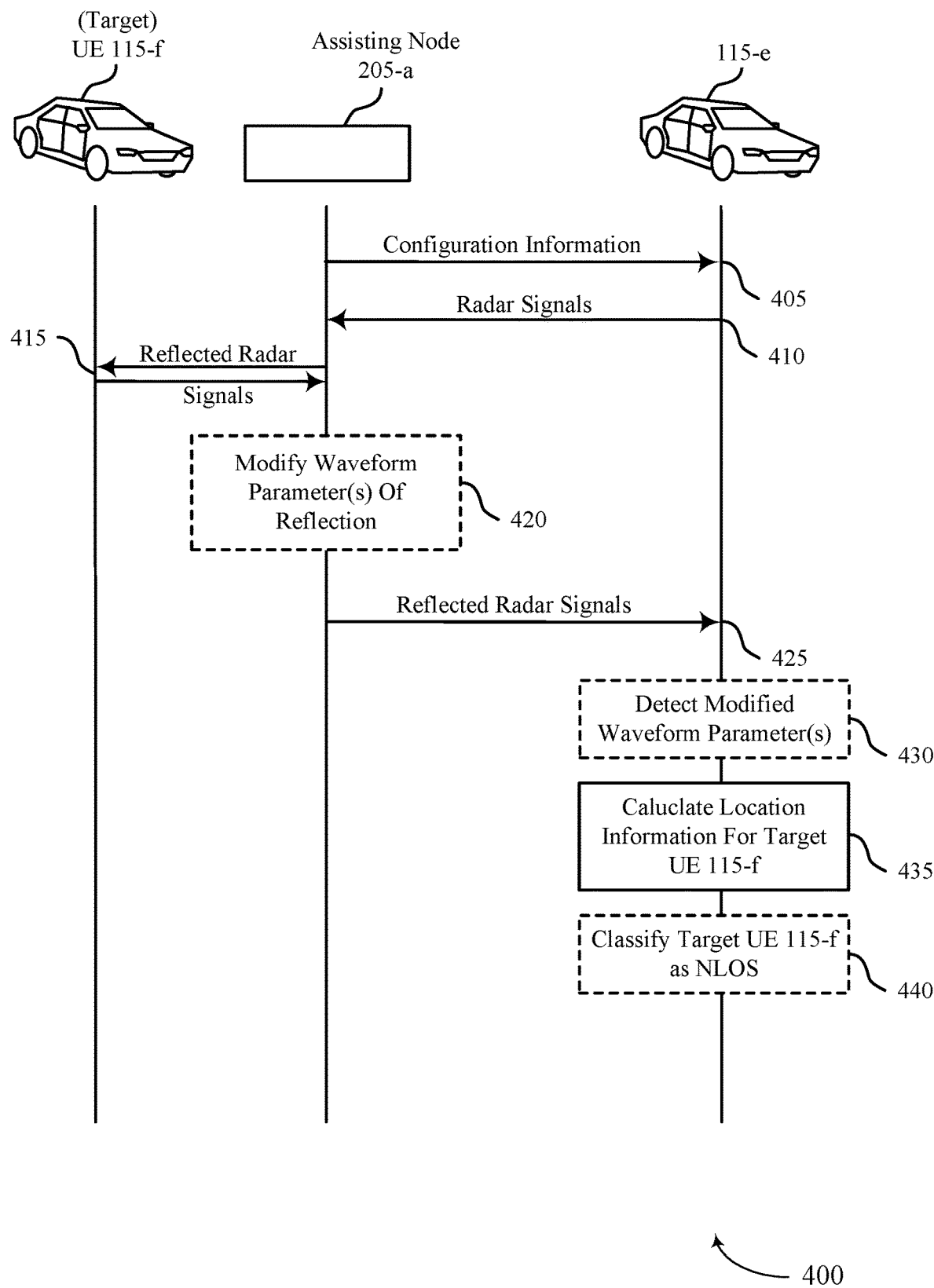
FIG. 4 illustrates an example of a process flow that supports assisting node radar assistance in accordance with aspects of the present disclosure.

FIG. 4 illustrates an example of a process flow 400 that supports assisting node radar assistance in accordance with aspects of the present disclosure. In some examples, process flow 400 may implement aspects of wireless communications system 100, wireless communications system 200, and wireless communication system 300. The process flow 400 may illustrate an example of a UE 115-e and UE 115-f, which may be examples of UEs 115 as described with reference to FIG. 1. In some examples, UE 115-e may receive configuration information from assisting node 205-a, which may be an example of a RIS 305 or a repeater as described with reference to FIGS. 2 and 3, and may calculate location information for a target UE 115-d based on reflections of radar signaling and the configuration information. Alternative examples of the following may be implemented, where some processes are performed in a different order than described or are not performed. In some cases, processes may include additional features not mentioned below, or further processes may be added.

At 405, UE 115-e, which may be a vehicle UE 115 in a V2X system, may receive signaling indicating configuration information for a reflection from assisting node 205-a. The reflection may be of one or more sets of radar signals transmitted from UE 115-e. In some cases, the configuration information may include a target detection operation schedule for the one or more sets of radar signals, an azimuth angle of the target, an elevation angle of the target, a persistence time for target detection operations, calibration information, location information of assisting node 205-a, or a combination thereof.

At 410, UE 115-e may transmit one or more sets of radar signals towards assisting node 205-a. In some cases, assisting node 205-a may be an intelligent reflective surface (e.g., an RIS), an analog repeater, a digital repeater, or a combination thereof.

At 415, assisting node 205-a may reflect the one or more sets of radar signals transmitted from UE 115-e towards target UE 115-f. Target UE 115-f may reflect the one or more sets of radar signals back to assisting node 205-a.

At 420, assisting node 205-a may modify one or more waveform parameters of the reflection based on the transmitted configuration information. The waveform parameters may include a deterministic slow-time pattern phase, a phase correction, a frequency offset correction, an assisting node reflection signature, a programmable weight to apply to the reflection, or a combination thereof. UE 115-e may vary the width of a transmit beam, assisting node 205-a may vary the width of the transmit beam, or a combination thereof. In some cases, assisting node 205-a may apply the waveform parameters to the reflection per radar signal, per processing interval (e.g., CPI), or both.

At 425, UE 115-e may receive the reflection for the one or more sets of radar signals from assisting node 205-a.

At 430, UE 115-e may detect the one or more modified waveform parameters based on the received configuration information.

At 435, UE 115-e may calculate location information for a target, such as UE 115-f, based on processing the reflection of the one or more sets of radar signals according to the configuration information. For example, UE 115-e may perform a beamforming operation to search for UE 115-f. In some other examples, UE 115-e may perform a LOS search to determine a direction of assisting node 205-a, may perform a NLOS search according to the configuration information (e.g., by varying a width of a transmit beam), and may estimate a range of UE 115-f based on performing the LOS search, the NLOS search, or both For example, At 440, UE 115-e may classify UE 115-f as NLOS based on the detected waveform parameters. Additionally or alternatively, UE 115-e may determine location information of assisting node 205-a based on receiving the location information of the assisting node (e.g., receiving a GPS location), estimating the location information of the assisting node, or both. UE 115-e may classify UE 115-f as NLOS based on the location information of assisting node 205-a and a range of UE 115-f being greater than a threshold range. The threshold range may be specific to assisting node 205-*a*, and may be configured or otherwise defined at assisting node 205—(e.g., by control signaling from a base station 105, RSU, or other network device).

Figure 5:
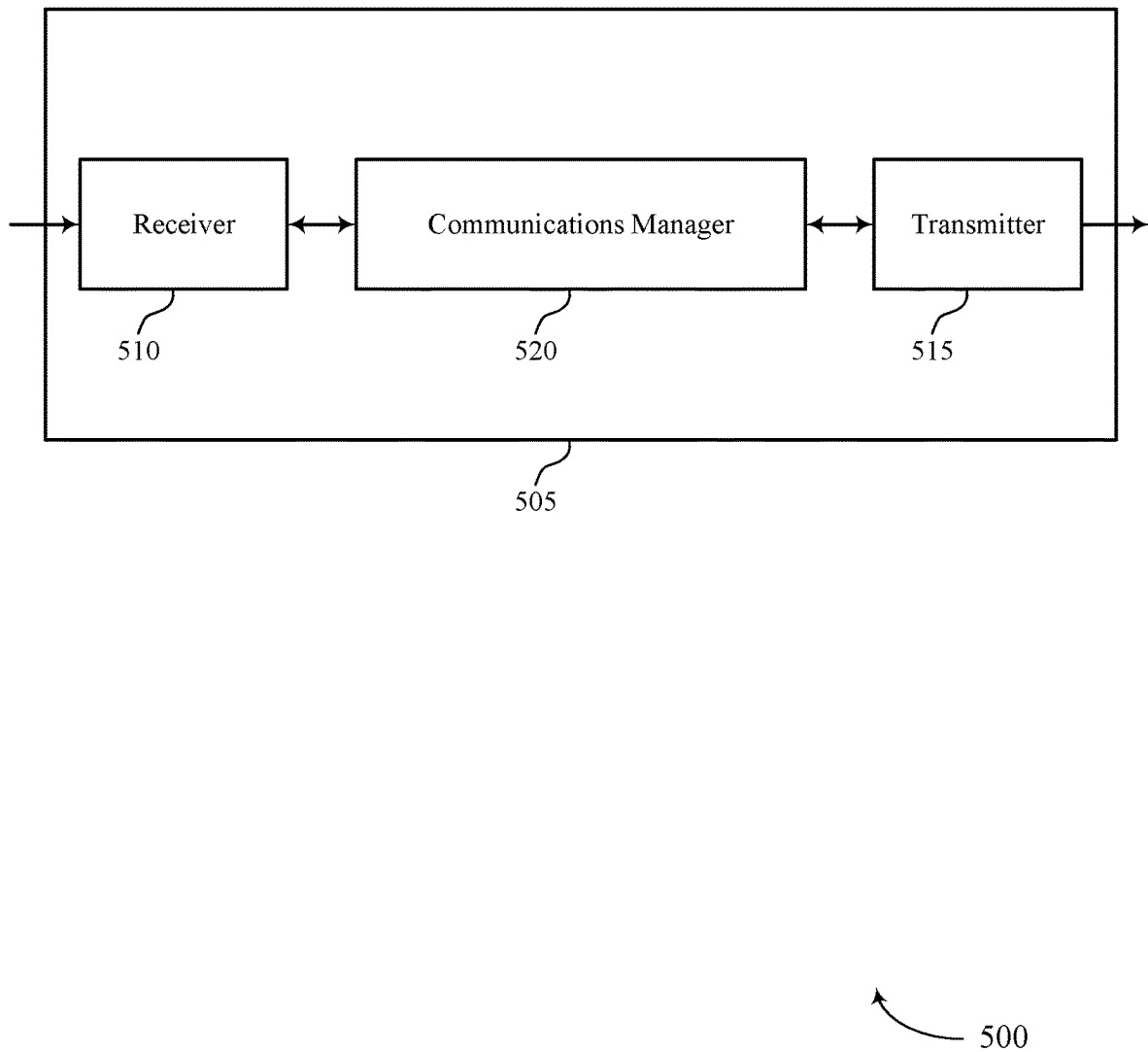
FIGS. 5 and 6 show block diagrams of devices that support assisting node radar assistance in accordance with aspects of the present disclosure.

FIG. 5 shows a block diagram 500 of a device 505 that supports assisting node radar assistance in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to assisting node radar assistance). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to assisting node radar assistance). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of assisting node radar assistance as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving signaling indicating configuration information associated with a reflection, by an assisting node, of one or more sets of radar signals transmitted from the UE. The communications manager 520 may be configured as or otherwise support a means for receiving, via the assisting node, the reflection for the one or more sets of radar signals. The communications manager 520 may be configured as or otherwise support a means for calculating location information for a target associated with the reflection of the one or more sets of radar signals based on the configuration information.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a UE 115 to receive configuration information from assisting node and calculate location information for a target based on reflections of radar signaling and the configuration information, which may cause reduced processing, reduced power consumption, more efficient utilization of communication resources, and the like.

Figure 6:
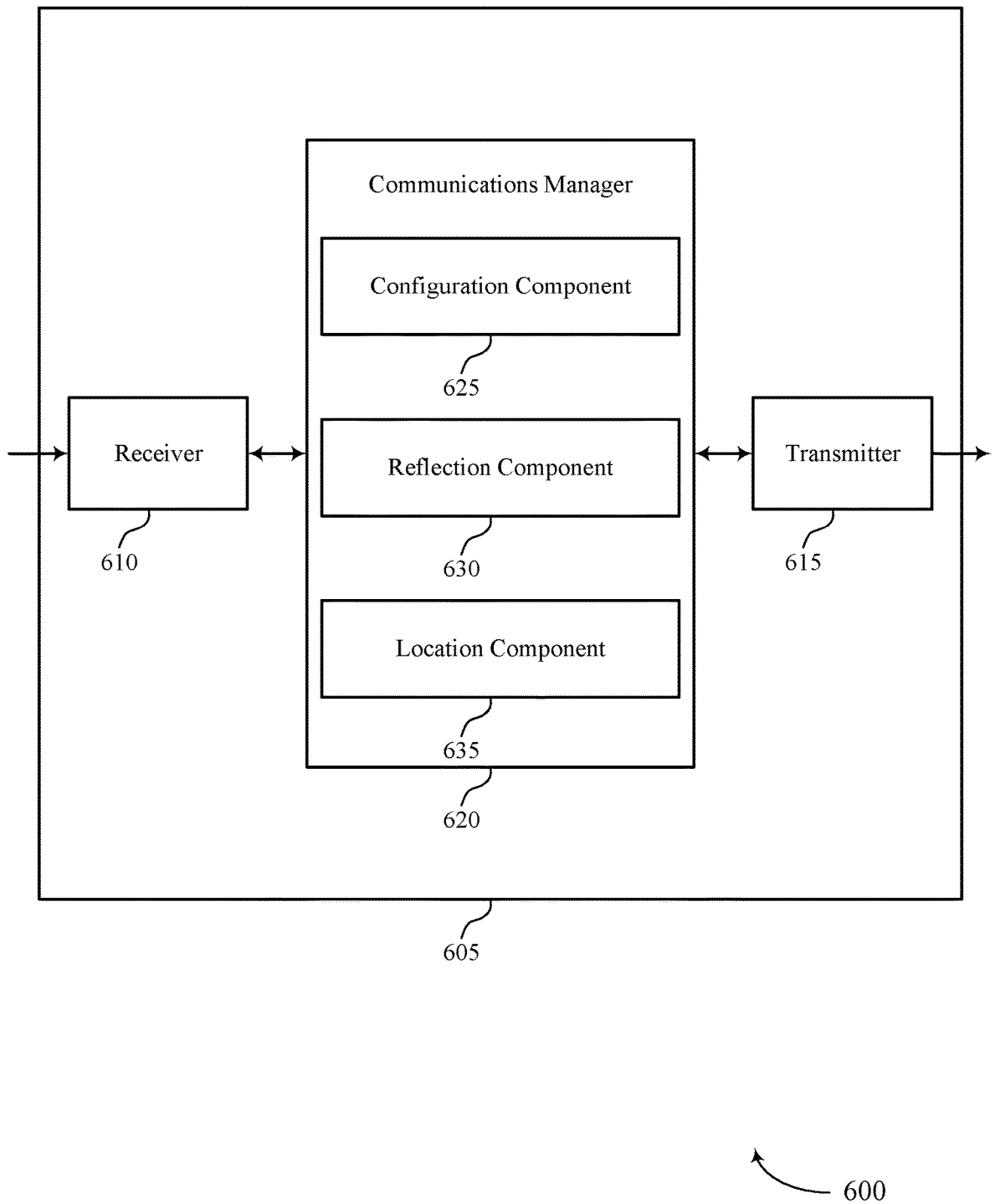

FIG. 6 shows a block diagram 600 of a device 605 that supports assisting node radar assistance in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to assisting node radar assistance). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to assisting node radar assistance). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of assisting node radar assistance as described herein. For example, the communications manager 620 may include a configuration component 625, a reflection component 630, a location component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration component 625 may be configured as or otherwise support a means for receiving signaling indicating configuration information associated with a reflection, by an assisting node, of one or more sets of radar signals transmitted from the UE. The reflection component 630 may be configured as or otherwise support a means for receiving, via the assisting node, the reflection for the one or more sets of radar signals. The location component 635 may be configured as or otherwise support a means for calculating location information for a target associated with the reflection of the one or more sets of radar signals based on the configuration information.

Figure 7:
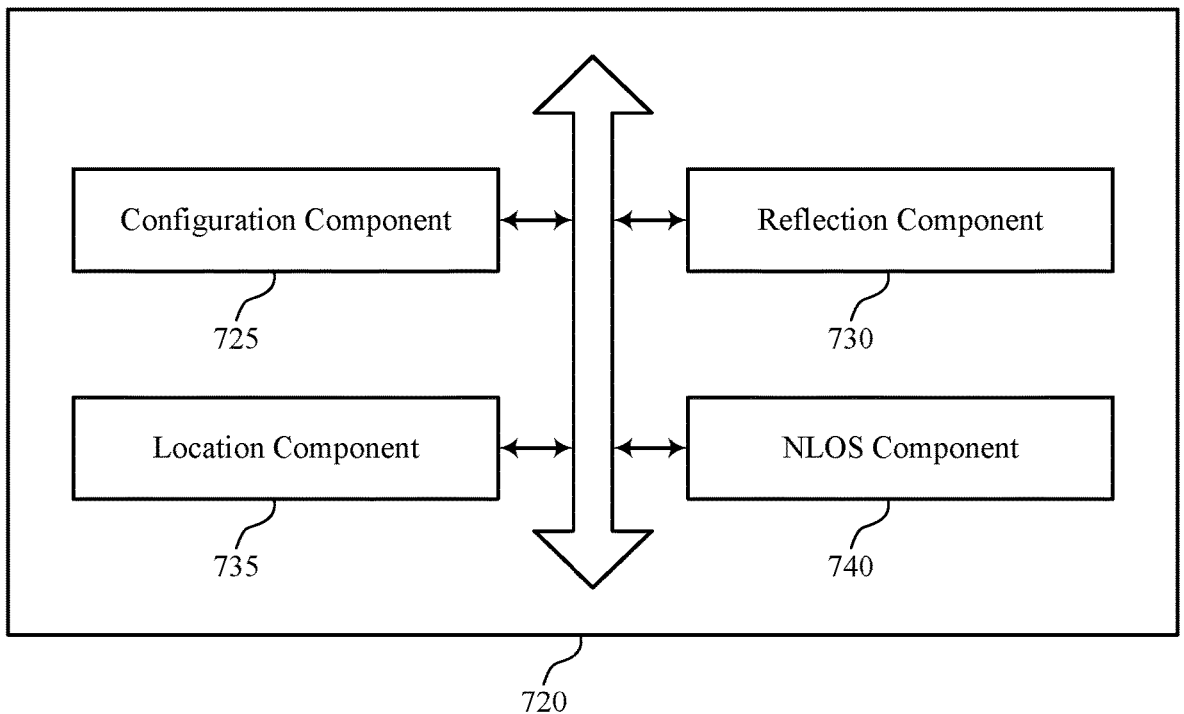
FIG. 7 shows a block diagram of a communications manager that supports assisting node radar assistance in accordance with aspects of the present disclosure.

FIG. 7 shows a block diagram 700 of a communications manager 720 that supports assisting node radar assistance in accordance with aspects of the present disclosure. The communications manager 720 may be an example of aspects of a communications manager 520, a communications manager 620, or both, as described herein. The communications manager 720, or various components thereof, may be an example of means for performing various aspects of assisting node radar assistance as described herein. For example, the communications manager 720 may include a configuration component 725, a reflection component 730, a location component 735, an NLOS component 740, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving signaling indicating configuration information associated with a reflection, by an assisting node, of one or more sets of radar signals transmitted from the UE. The reflection component 730 may be configured as or otherwise support a means for receiving, via the assisting node, the reflection for the one or more sets of radar signals. The location component 735 may be configured as or otherwise support a means for calculating location information for a target associated with the reflection of the one or more sets of radar signals based on the configuration information.

In some examples, the reflection component 730 may be configured as or otherwise support a means for detecting one or more modified waveform parameters corresponding to the reflection of the one or more sets of radar signals based on the received configuration information. In some examples, the NLOS component 740 may be configured as or otherwise support a means for classifying the target as non-line-of-sight based on the detected one or more modified waveform parameters.

In some examples, the one or more modified waveform parameters including a deterministic slow-time pattern phase, a phase correction, a frequency offset correction, an assisting node reflection signature, or a combination thereof.

In some examples, the location component 735 may be configured as or otherwise support a means for determining location information of the assisting node based on receiving the location information of the assisting node, estimating the location information of the assisting node, or both. In some examples, the NLOS component 740 may be configured as or otherwise support a means for classifying the target as non-line-of-sight based on the location information of the assisting node and a range of the target being greater than a threshold range.

In some examples, to support calculating the location information for the target, the location component 735 may be configured as or otherwise support a means for performing a beamforming operation to search for the target.

In some examples, to support calculating the location information for the target, the NLOS component 740 may be configured as or otherwise support a means for performing a line-of-sight search to determine a direction of the assisting node. In some examples, to support calculating the location information for the target, the NLOS component 740 may be configured as or otherwise support a means for performing a non-line-of-sight search according to the configuration information, where the non-line-of-sight search includes varying a width of a transmit beam. In some examples, to support calculating the location information for the target, the location component 735 may be configured as or otherwise support a means for estimating a range of the target based on performing the line-of-sight search, the non-line-of-sight search, or both.

In some examples, the varying the width of the transmit beam includes the UE varying the width of the transmit beam, the assisting node varying the width of the transmit beam, or a combination thereof.

In some examples, the configuration information includes a target detection operation schedule corresponding to the one or more sets of radar signals, an azimuth angle associated with the target, an elevation angle associated with the target, a persistence time for a set of multiple target detection operations, calibration information, location information of the assisting node, or a combination thereof.

Figure 8:
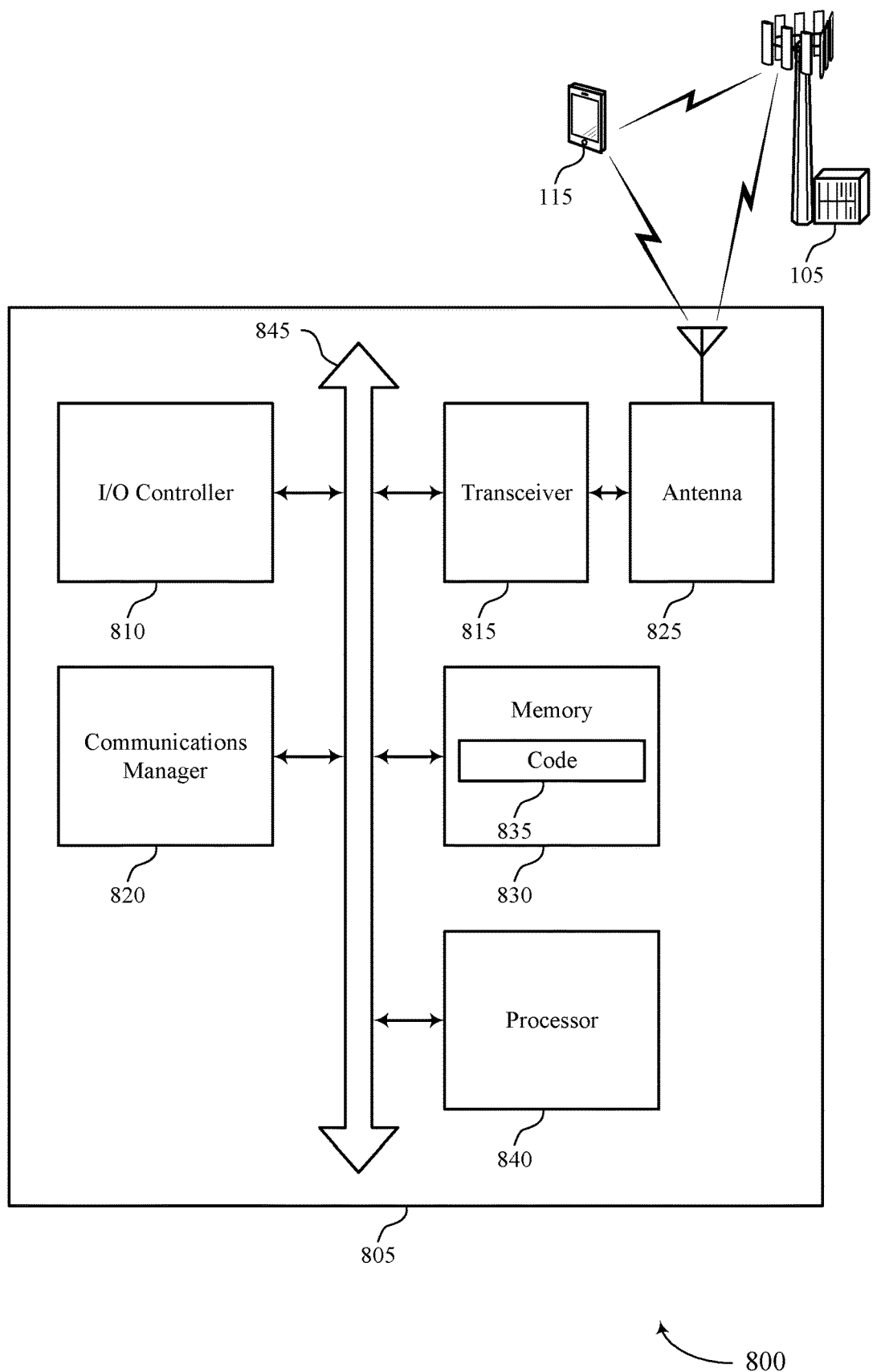
FIG. 8 shows a diagram of a system including a device that supports assisting node radar assistance in accordance with aspects of the present disclosure.

FIG. 8 shows a diagram of a system 800 including a device 805 that supports assisting node radar assistance in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting assisting node radar assistance). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving signaling indicating configuration information associated with a reflection, by an assisting node, of one or more sets of radar signals transmitted from the UE. The communications manager 820 may be configured as or otherwise support a means for receiving, via the assisting node, the reflection for the one or more sets of radar signals. The communications manager 820 may be configured as or otherwise support a means for calculating location information for a target associated with the reflection of the one or more sets of radar signals based on the configuration information.

By including or configuring the communications manager 820 in accordance with examples as described herein, the device 805 may support techniques for a UE 115 to receive configuration information from assisting node and calculate location information for a target based on reflections of radar signaling and the configuration information, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of assisting node radar assistance as described herein, or the processor 840 and the memory 830 may be otherwise configured to perform or support such operations.

Figure 9:
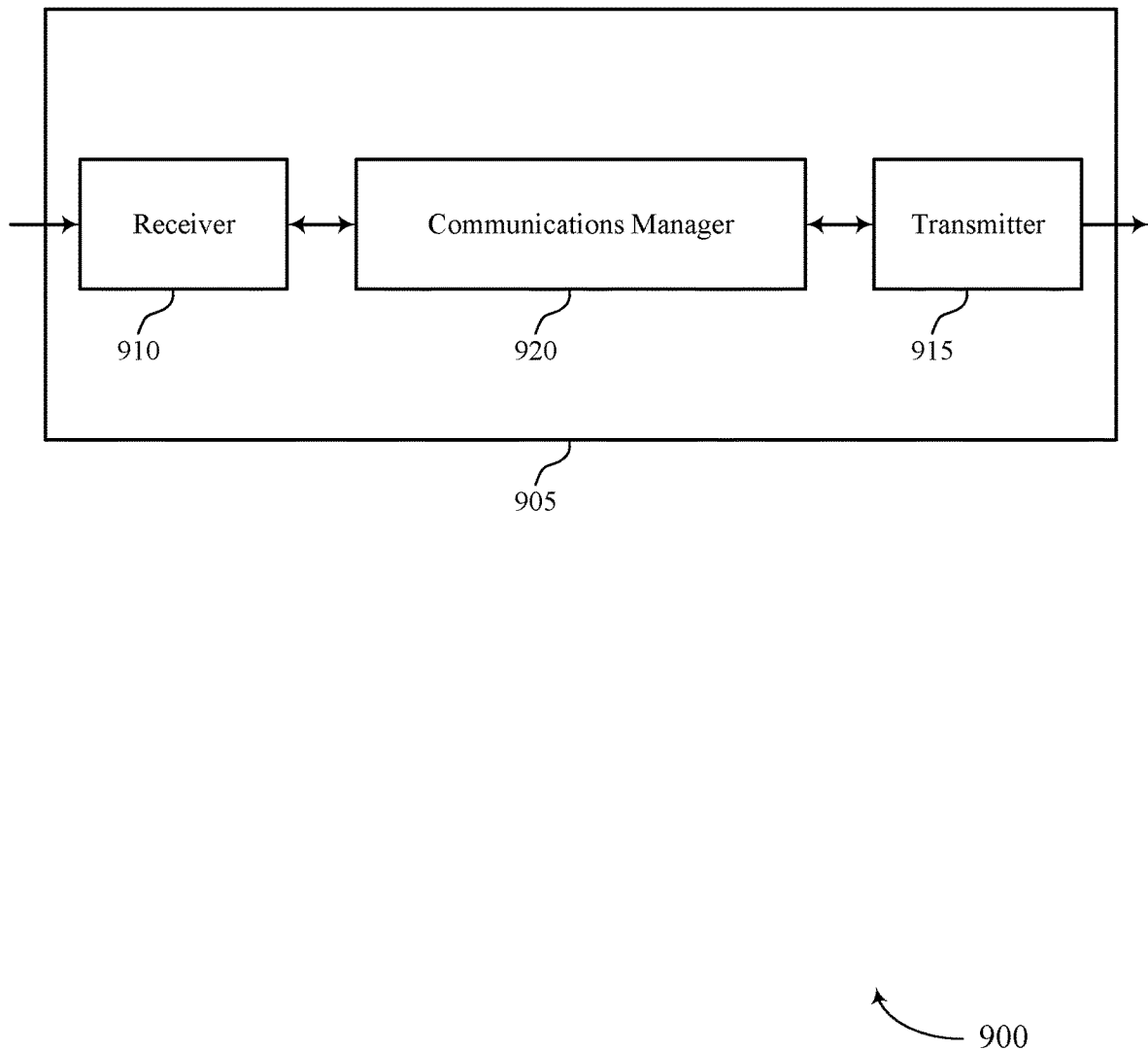
FIGS. 9 and 10 show block diagrams of devices that support assisting node radar assistance in accordance with aspects of the present disclosure.

FIG. 9 shows a block diagram 900 of a device 905 that supports assisting node radar assistance in accordance with aspects of the present disclosure. The device 905 may be an example of aspects of an assisting node as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to assisting node radar assistance). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to assisting node radar assistance). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of assisting node radar assistance as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at an assisting node in accordance with examples as disclosed herein. For example, the communications manager 920 may be configured as or otherwise support a means for transmitting, to a UE, signaling indicating configuration information associated with reflections, by the assisting node, of one or more sets of radar signals transmitted from the UE. The communications manager 920 may be configured as or otherwise support a means for reflecting the one or more sets of radar signals transmitted from the UE towards a target. The communications manager 920 may be configured as or otherwise support a means for reflecting the reflection of the one or more sets of radar signals from the target towards the UE according to the configuration information.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a UE 115 to receive configuration information from assisting node and calculate location information for a target based on reflections of radar signaling and the configuration information, which may cause reduced processing, reduced power consumption, more efficient utilization of communication resources, and the like.

Figure 10:
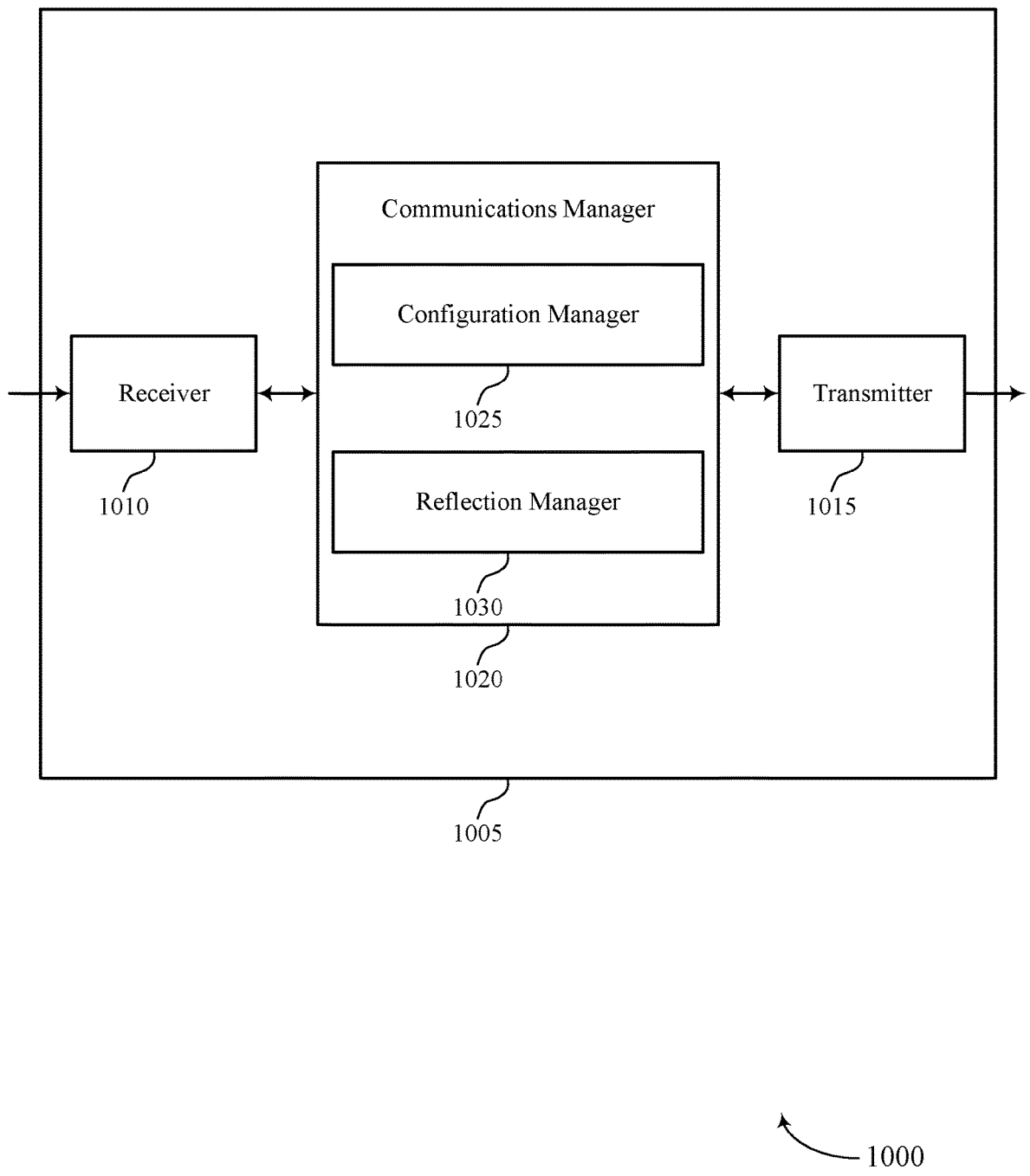

FIG. 10 shows a block diagram 1000 of a device 1005 that supports assisting node radar assistance in accordance with aspects of the present disclosure. The device 1005 may be an example of aspects of a device 905 or an assisting node 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to assisting node radar assistance). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to assisting node radar assistance). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of assisting node radar assistance as described herein. For example, the communications manager 1020 may include a configuration manager 1025 a reflection manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at an assisting node in accordance with examples as disclosed herein. The configuration manager 1025 may be configured as or otherwise support a means for transmitting, to a UE, signaling indicating configuration information associated with reflections, by the assisting node, of one or more sets of radar signals transmitted from the UE. The reflection manager 1030 may be configured as or otherwise support a means for reflecting the one or more sets of radar signals transmitted from the UE towards a target. The reflection manager 1030 may be configured as or otherwise support a means for reflecting the reflection of the one or more sets of radar signals from the target towards the UE according to the configuration information.

Figure 11:
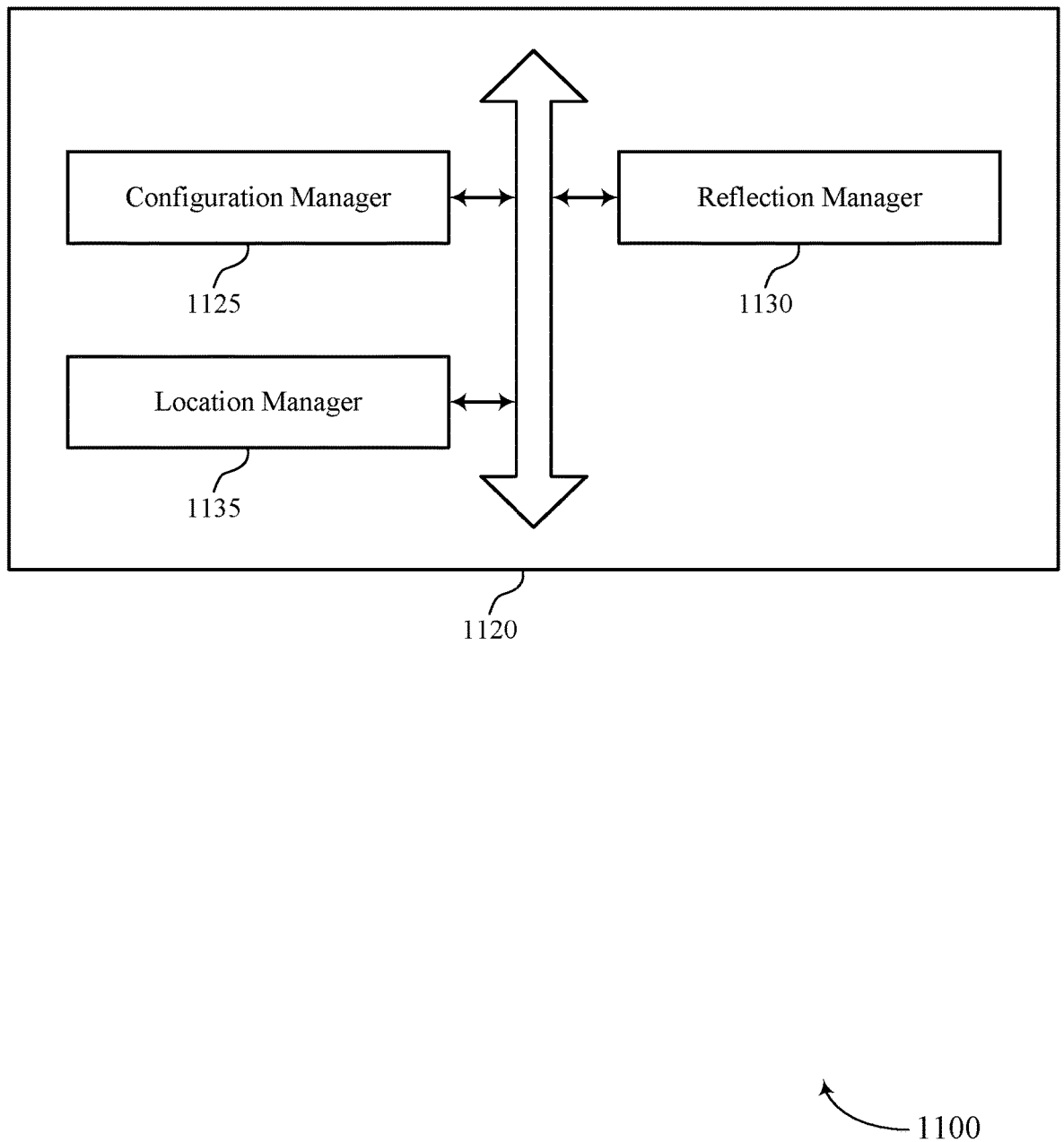
FIG. 11 shows a block diagram of a communications manager that supports assisting node radar assistance in accordance with aspects of the present disclosure.

FIG. 11 shows a block diagram 1100 of a communications manager 1120 that supports assisting node radar assistance in accordance with aspects of the present disclosure. The communications manager 1120 may be an example of aspects of a communications manager 920, a communications manager 1020, or both, as described herein. The communications manager 1120, or various components thereof, may be an example of means for performing various aspects of assisting node radar assistance as described herein. For example, the communications manager 1120 may include a configuration manager 1125, a reflection manager 1130, a location manager 1135, or any combination thereof. Each of these components may communicate, directly or indirectly, with one another (e.g., via one or more buses).

The communications manager 1120 may support wireless communication at an assisting node in accordance with examples as disclosed herein. The configuration manager 1125 may be configured as or otherwise support a means for transmitting, to a UE, signaling indicating configuration information associated with reflections, by the assisting node, of one or more sets of radar signals transmitted from the UE. The reflection manager 1130 may be configured as or otherwise support a means for reflecting the one or more sets of radar signals transmitted from the UE towards a target. In some examples, the reflection manager 1130 may be configured as or otherwise support a means for reflecting the reflection of the one or more sets of radar signals from the target towards the UE according to the configuration information.

In some examples, the location manager 1135 may be configured as or otherwise support a means for transmitting, to the UE, location information of the assisting node.

In some examples, to support reflecting the reflection, the reflection manager 1130 may be configured as or otherwise support a means for modifying one or more waveform parameters corresponding to the reflection based on the transmitted configuration information, the one or more modified waveform parameters including a deterministic slow-time pattern phase, a phase correction, a frequency offset correction, an assisting node reflection signature, a programmable weight to apply to the reflection, or a combination thereof.

In some examples, the reflection manager 1130 may be configured as or otherwise support a means for applying the one or more modified waveform parameters to the reflection per radar signal, per processing interval, or both.

In some examples, to support reflecting the reflection, the configuration manager 1125 may be configured as or otherwise support a means for transmitting the reflection according to the configuration information.

In some examples, to support reflecting the reflection, the reflection manager 1130 may be configured as or otherwise support a means for varying a width of a transmit beam associated with the reflection.

In some examples, the assisting node includes an intelligent reflective surface, an analog repeater, a digital repeater, or a combination thereof.

In some examples, the configuration information includes a target detection operation schedule corresponding to the one or more sets of radar signals, an azimuth angle associated with the target, an elevation angle associated with the target, a persistence time for a set of multiple target detection operations, calibration information, location information of the assisting node, or a combination thereof.

Figure 12:
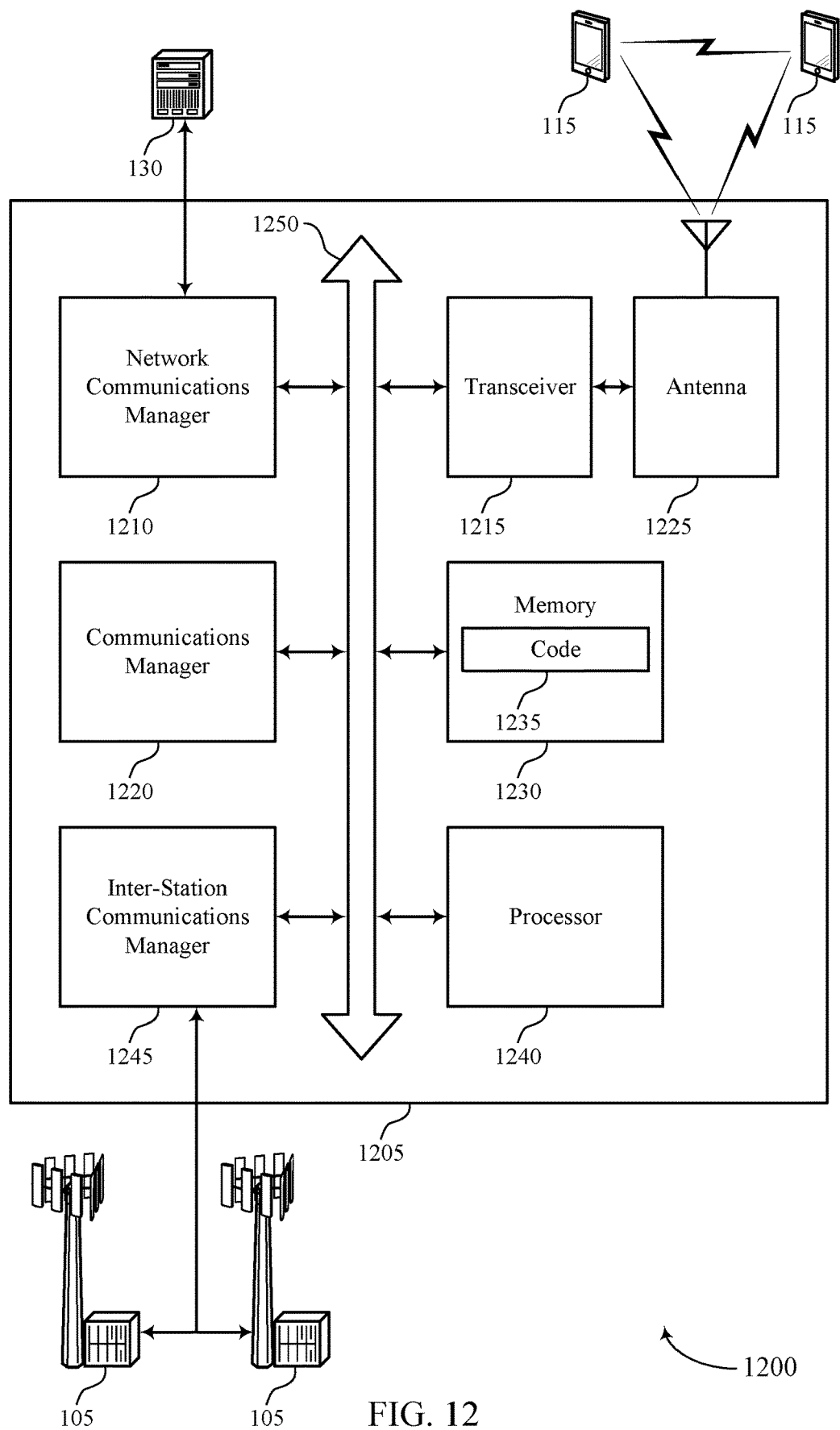
FIG. 12 shows a diagram of a system including a device that supports assisting node radar assistance in accordance with aspects of the present disclosure.

FIG. 12 shows a diagram of a system 1200 including a device 1205 that supports assisting node radar assistance in accordance with aspects of the present disclosure. The device 1205 may be an example of or include the components of a device 905, a device 1005, or an assisting node as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting assisting node radar assistance). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at an assisting node in accordance with examples as disclosed herein. For example, the communications manager 1220 may be configured as or otherwise support a means for transmitting, to a UE, signaling indicating configuration information associated with reflections, by the assisting node, of one or more sets of radar signals transmitted from the UE. The communications manager 1220 may be configured as or otherwise support a means for reflecting the one or more sets of radar signals transmitted from the UE towards a target. The communications manager 1220 may be configured as or otherwise support a means for reflecting the reflection of the one or more sets of radar signals from the target towards the UE according to the configuration information.

By including or configuring the communications manager 1220 in accordance with examples as described herein, the device 1205 may support techniques for a UE 115 to receive configuration information from assisting node and calculate location information for a target based on reflections of radar signaling and the configuration information, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of assisting node radar assistance as described herein, or the processor 1240 and the memory 1230 may be otherwise configured to perform or support such operations.

Figure 13:
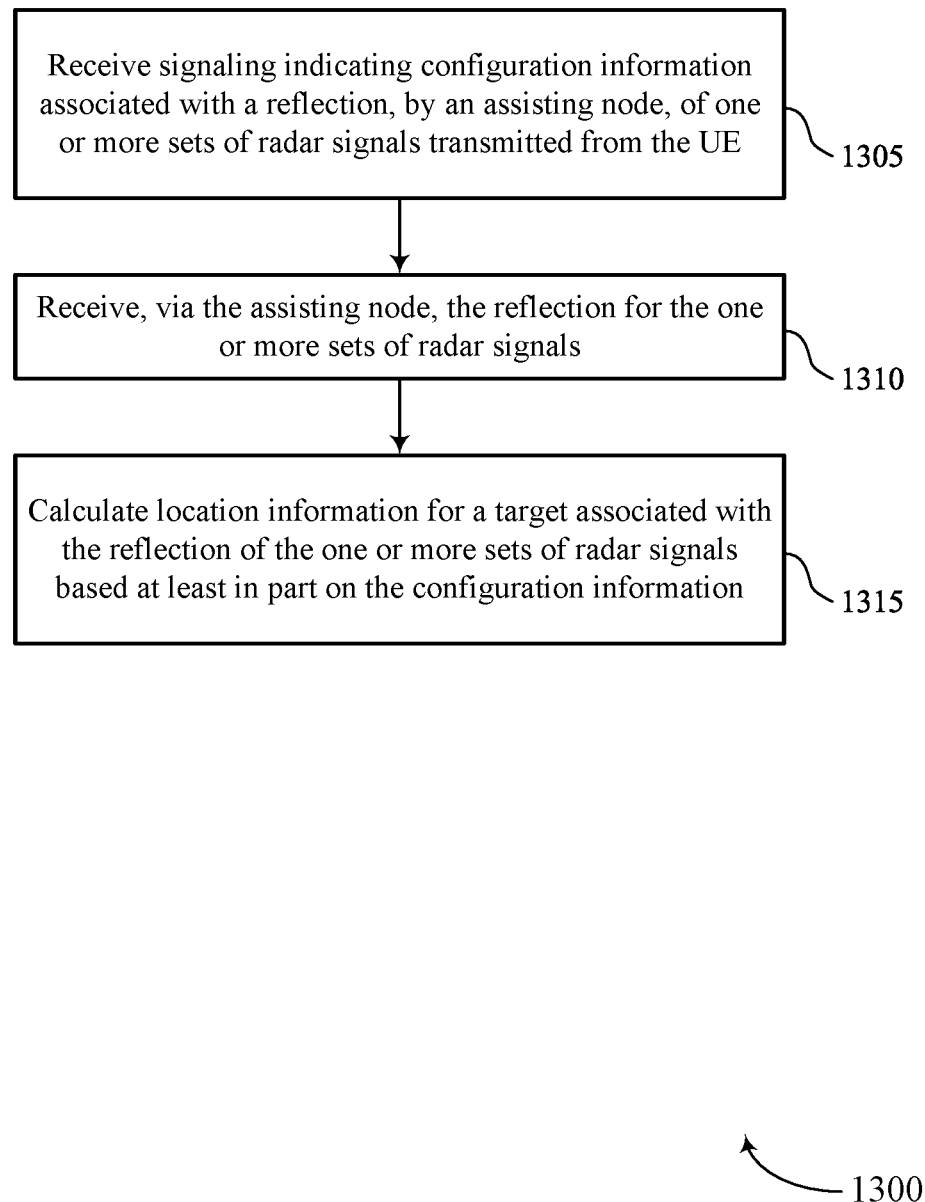
FIGS. 13 through 17 show flowcharts illustrating methods that support assisting node radar assistance in accordance with aspects of the present disclosure.

FIG. 13 shows a flowchart illustrating a method 1300 that supports assisting node radar assistance in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving signaling indicating configuration information associated with a reflection, by an assisting node, of one or more sets of radar signals transmitted from the UE. The operations of 1305 may be performed in accordance with examples as disclosed herein. In some examples, aspects of the operations of 1305 may be performed by a configuration component 725 as described with reference to FIG. 7.

At 1310, the method may include receiving, via the assisting node, the reflection for the one or more sets of radar signals. The operations of 1310 may be performed in accordance with examples as disclosed herein. In some examples, aspects of the operations of 1310 may be performed by a reflection component 730 as described with reference to FIG. 7.

At 1315, the method may include calculating location information for a target associated with the reflection of the one or more sets of radar signals based on the configuration information. The operations of 1315 may be performed in accordance with examples as disclosed herein. In some examples, aspects of the operations of 1315 may be performed by a location component 735 as described with reference to FIG. 7.

Figure 14:
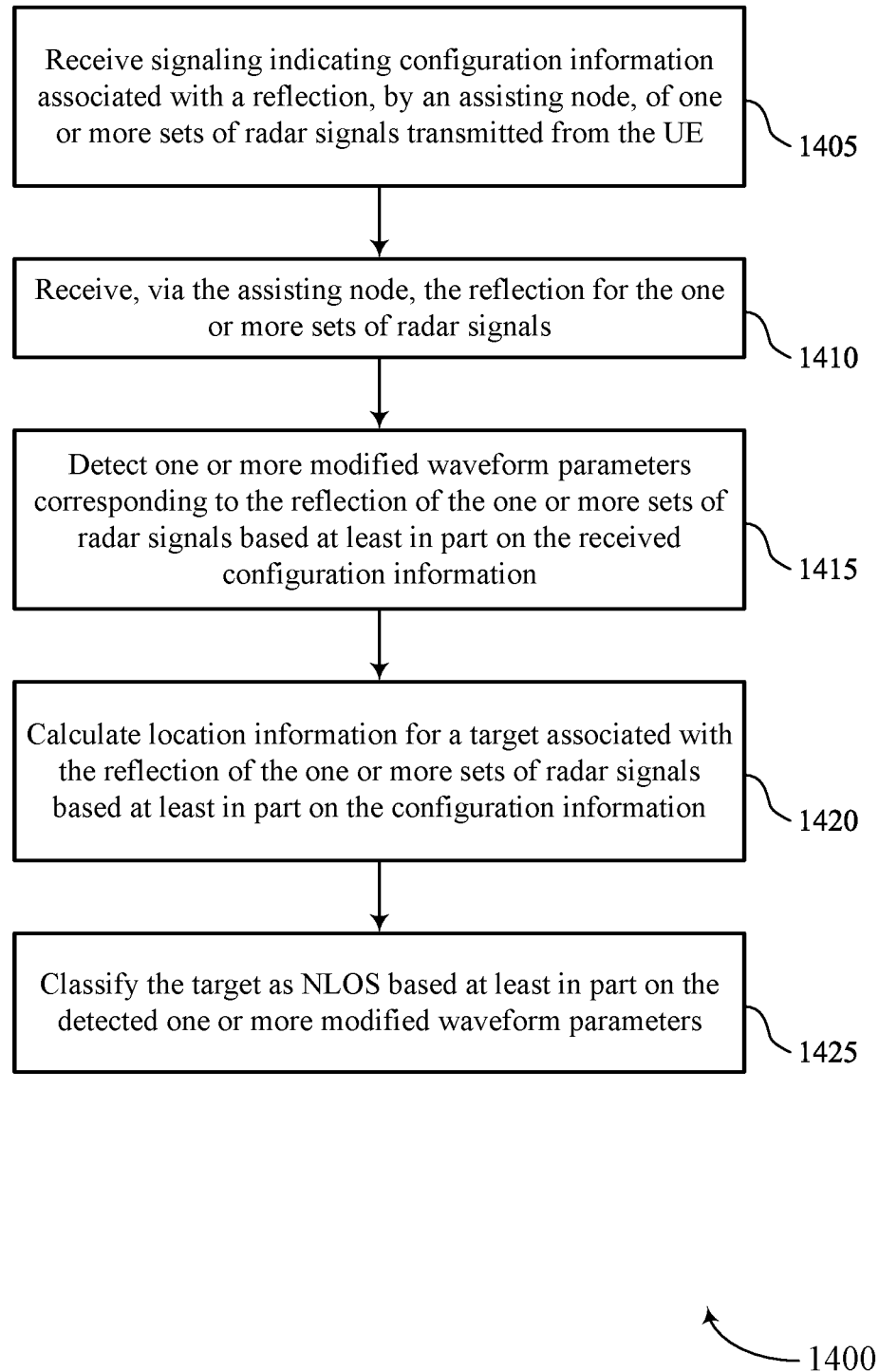

FIG. 14 shows a flowchart illustrating a method 1400 that supports assisting node radar assistance in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving signaling indicating configuration information associated with a reflection, by an assisting node, of one or more sets of radar signals transmitted from the UE. The operations of 1405 may be performed in accordance with examples as disclosed herein. In some examples, aspects of the operations of 1405 may be performed by a configuration component 725 as described with reference to FIG. 7.

At 1410, the method may include receiving, via the assisting node, the reflection for the one or more sets of radar signals. The operations of 1410 may be performed in accordance with examples as disclosed herein. In some examples, aspects of the operations of 1410 may be performed by a reflection component 730 as described with reference to FIG. 7.

At 1415, the method may include detecting one or more modified waveform parameters corresponding to the reflection of the one or more sets of radar signals based on the received configuration information. The operations of 1415 may be performed in accordance with examples as disclosed herein. In some examples, aspects of the operations of 1415 may be performed by a reflection component 730 as described with reference to FIG. 7.

At 1420, the method may include calculating location information for a target associated with the reflection of the one or more sets of radar signals based on the configuration information. The operations of 1420 may be performed in accordance with examples as disclosed herein. In some examples, aspects of the operations of 1420 may be performed by a location component 735 as described with reference to FIG. 7.

At 1425, the method may include classifying the target as non-line-of-sight based on the detected one or more modified waveform parameters. The operations of 1425 may be performed in accordance with examples as disclosed herein.

In some examples, aspects of the operations of 1425 may be performed by an NLOS component 740 as described with reference to FIG. 7.

Figure 15:
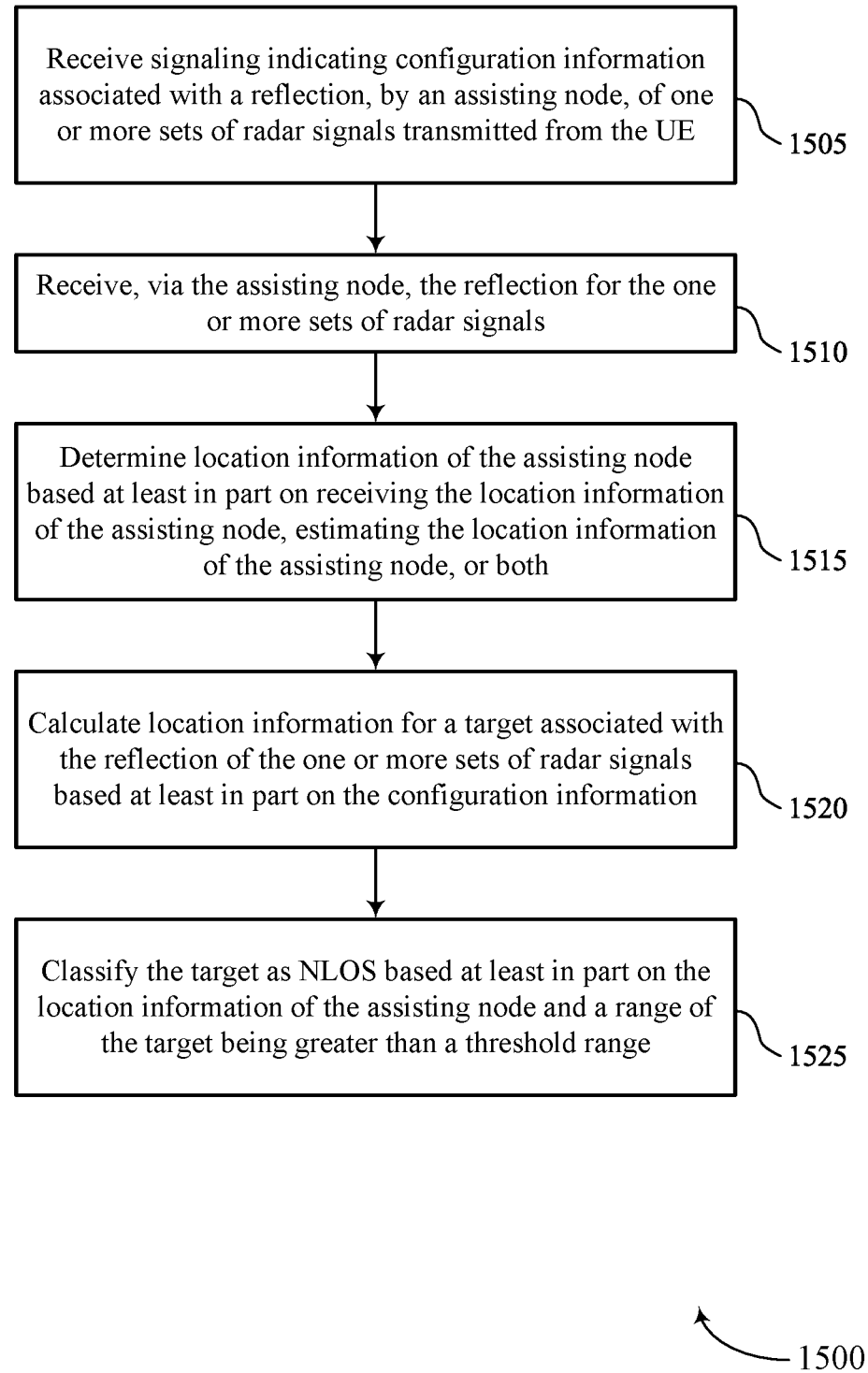

FIG. 15 shows a flowchart illustrating a method 1500 that supports assisting node radar assistance in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving signaling indicating configuration information associated with a reflection, by an assisting node, of one or more sets of radar signals transmitted from the UE. The operations of 1505 may be performed in accordance with examples as disclosed herein. In some examples, aspects of the operations of 1505 may be performed by a configuration component 725 as described with reference to FIG. 7.

At 1510, the method may include receiving, via the assisting node, the reflection for the one or more sets of radar signals. The operations of 1510 may be performed in accordance with examples as disclosed herein. In some examples, aspects of the operations of 1510 may be performed by a reflection component 730 as described with reference to FIG. 7.

At 1515, the method may include determining location information of the assisting node based on receiving the location information of the assisting node, estimating the location information of the assisting node, or both. The operations of 1515 may be performed in accordance with examples as disclosed herein. In some examples, aspects of the operations of 1515 may be performed by a location component 735 as described with reference to FIG. 7.

At 1520, the method may include calculating location information for a target associated with the reflection of the one or more sets of radar signals based on the configuration information. The operations of 1520 may be performed in accordance with examples as disclosed herein. In some examples, aspects of the operations of 1520 may be performed by a location component 735 as described with reference to FIG. 7.

At 1525, the method may include classifying the target as non-line-of-sight based on the location information of the assisting node and a range of the target being greater than a threshold range. The operations of 1525 may be performed in accordance with examples as disclosed herein. In some examples, aspects of the operations of 1525 may be performed by an NLOS component 740 as described with reference to FIG. 7.

Figure 16:
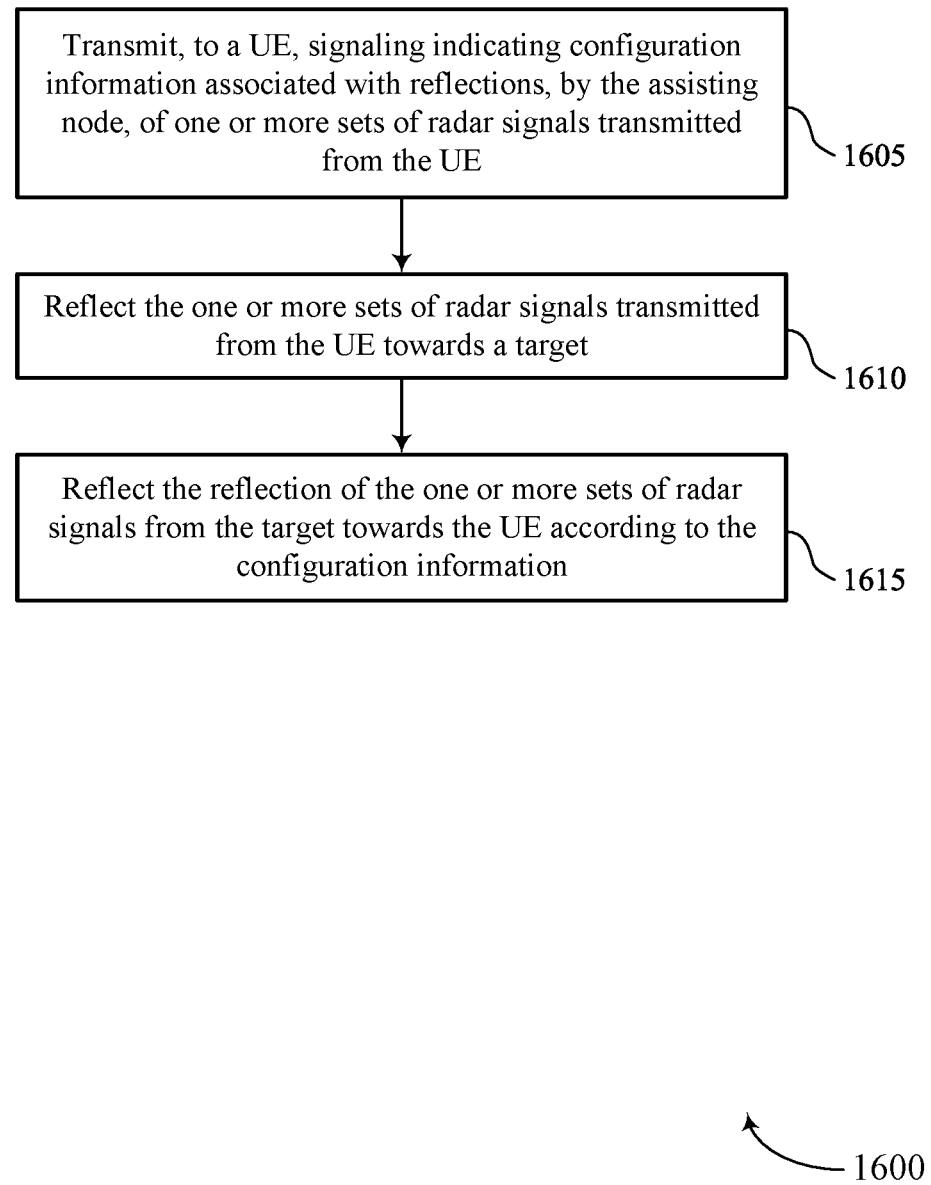

FIG. 16 shows a flowchart illustrating a method 1600 that supports assisting node radar assistance in accordance with aspects of the present disclosure. The operations of the method 1600 may be implemented by an assisting node or its components as described herein. For example, the operations of the method 1600 may be performed by an assisting node as described with reference to FIGS. 1 through 4 and 9 through 12. In some examples, an assisting node may execute a set of instructions to control the functional elements of the assisting node to perform the described functions. Additionally or alternatively, the assisting node may perform aspects of the described functions using special-purpose hardware.

At 1605, the method may include transmitting, to a UE, signaling indicating configuration information associated with reflections, by the assisting node, of one or more sets of radar signals transmitted from the UE. The operations of 1605 may be performed in accordance with examples as disclosed herein. In some examples, aspects of the operations of 1605 may be performed by a configuration manager 1125 as described with reference to FIG. 11.

At 1610, the method may include reflecting the one or more sets of radar signals transmitted from the UE towards a target. The operations of 1610 may be performed in accordance with examples as disclosed herein. In some examples, aspects of the operations of 1610 may be performed by a reflection manager 1130 as described with reference to FIG. 11.

At 1615, the method may include reflecting the reflection of the one or more sets of radar signals from the target towards the UE according to the configuration information. The operations of 1615 may be performed in accordance with examples as disclosed herein. In some examples, aspects of the operations of 1615 may be performed by a reflection manager 1130 as described with reference to FIG. 11.

Figure 17:
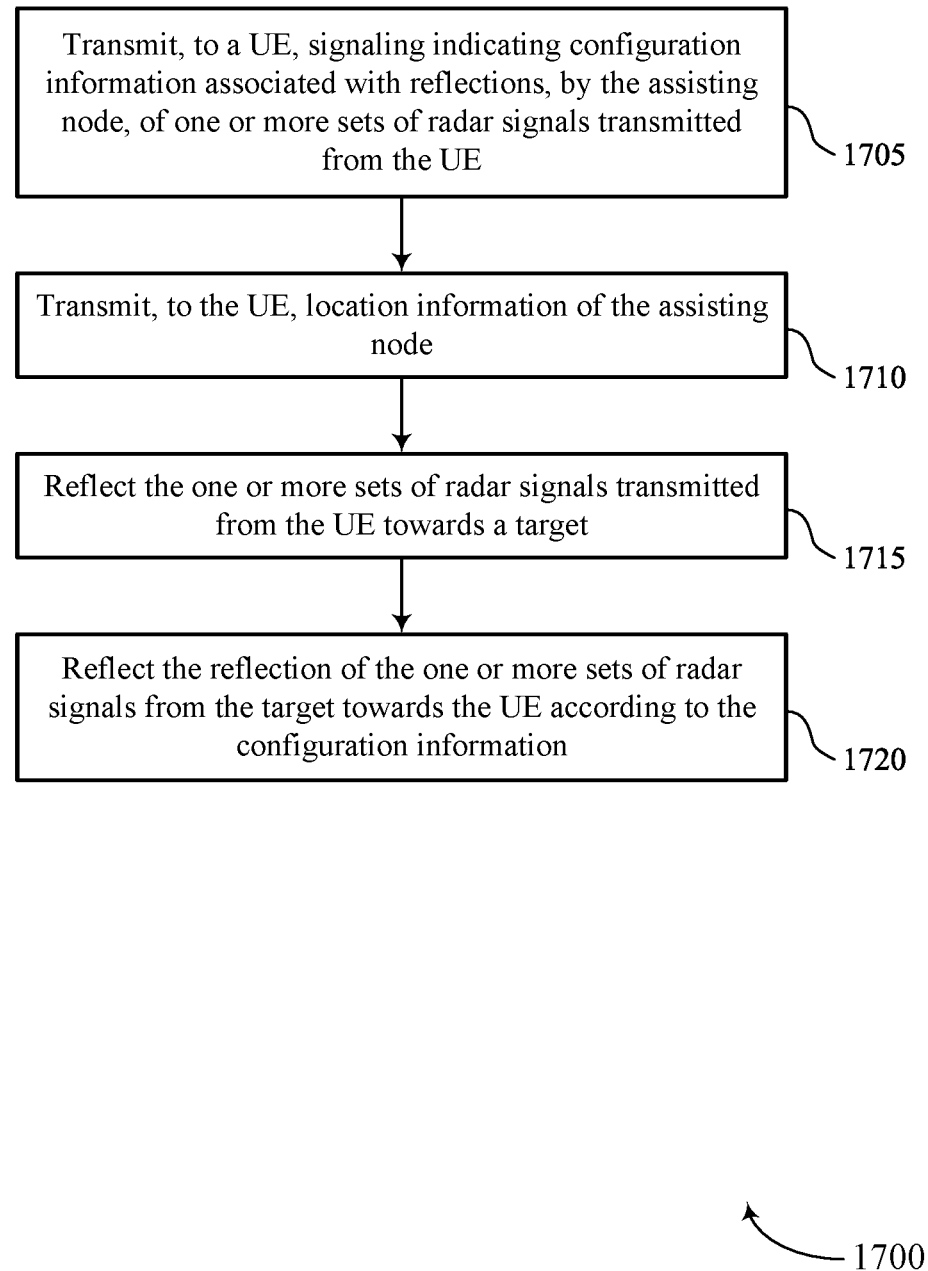

FIG. 17 shows a flowchart illustrating a method 1700 that supports assisting node radar assistance in accordance with aspects of the present disclosure. The operations of the method 1700 may be implemented by an assisting node or its components as described herein. For example, the operations of the method 1700 may be performed by an assisting node as described with reference to FIGS. 1 through 4 and 9 through 12. In some examples, an assisting node may execute a set of instructions to control the functional elements of the assisting node to perform the described functions. Additionally or alternatively, the assisting node may perform aspects of the described functions using special-purpose hardware.

At 1705, the method may include transmitting, to a UE, signaling indicating configuration information associated with reflections, by the assisting node, of one or more sets of radar signals transmitted from the UE. The operations of 1705 may be performed in accordance with examples as disclosed herein. In some examples, aspects of the operations of 1705 may be performed by a configuration manager 1125 as described with reference to FIG. 11.

At 1710, the method may include transmitting, to the UE, location information of the assisting node. The operations of 1710 may be performed in accordance with examples as disclosed herein. In some examples, aspects of the operations of 1710 may be performed by a location manager 1135 as described with reference to FIG. 11.

At 1715, the method may include reflecting the one or more sets of radar signals transmitted from the UE towards a target. The operations of 1715 may be performed in accordance with examples as disclosed herein. In some examples, aspects of the operations of 1715 may be performed by a reflection manager 1130 as described with reference to FIG. 11.

At 1720, the method may include reflecting the reflection of the one or more sets of radar signals from the target towards the UE according to the configuration information. The operations of 1720 may be performed in accordance with examples as disclosed herein. In some examples, aspects of the operations of 1720 may be performed by a reflection manager 1130 as described with reference to FIG. 11.

The following provides an overview of aspects of the present disclosure:

Aspect 1: A method for wireless communication at a UE, comprising: receiving signaling indicating configuration information associated with a reflection, by an assisting node, of one or more sets of radar signals transmitted from the UE; receiving, via the assisting node, the reflection for the one or more sets of radar signals; and calculating location information for a target associated with the reflection of the one or more sets of radar signals based at least in part on the configuration information.

Aspect 2: The method of aspect 1, further comprising: detecting one or more modified waveform parameters corresponding to the reflection of the one or more sets of radar signals based at least in part on the received configuration information; and classifying the target as non-line-of-sight based at least in part on the detected one or more modified waveform parameters.

Aspect 3: The method of aspect 2, wherein the one or more modified waveform parameters comprising a deterministic slow-time pattern phase, a phase correction, a frequency offset correction, an assisting node reflection signature, or a combination thereof.

Aspect 4: The method of any of aspects 1 through 3, further comprising: determining location information of the assisting node based at least in part on receiving the location information of the assisting node, estimating the location information of the assisting node, or both; and classifying the target as non-line-of-sight based at least in part on the location information of the assisting node and a range of the target being greater than a threshold range.

Aspect 5: The method of any of aspects 1 through 4, wherein calculating the location information for the target comprises: performing a beamforming operation to search for the target.

Aspect 6: The method of any of aspects 1 through 5, wherein calculating the location information for the target comprises: performing a line-of-sight search to determine a direction of the assisting node; performing a non-line-of-sight search according to the configuration information, wherein the non-line-of-sight search comprises varying a width of a transmit beam; and estimating a range of the target based at least in part on performing the line-of-sight search, the non-line-of-sight search, or both.

Aspect 7: The method of aspect 6, wherein the varying the width of the transmit beam comprises the UE varying the width of the transmit beam, the assisting node varying the width of the transmit beam, or a combination thereof.

Aspect 8: The method of any of aspects 1 through 7 wherein the configuration information comprises a target detection operation schedule corresponding to the one or more sets of radar signals, an azimuth angle associated with the target, an elevation angle associated with the target, a persistence time for a plurality of target detection operations, calibration information, location information of the assisting node, or a combination thereof.

Aspect 9: A method for wireless communication at an assisting node, comprising: transmitting, to a UE, signaling indicating configuration information associated with reflections, by the assisting node, of one or more sets of radar signals transmitted from the UE; reflecting the one or more sets of radar signals transmitted from the UE towards a target; and reflecting the reflection of the one or more sets of radar signals from the target towards the UE according to the configuration information.

Aspect 10: The method of aspect 9, further comprising: transmitting, to the UE, location information of the assisting node.

Aspect 11: The method of any of aspects 9 through 10, wherein reflecting the reflection comprises: modifying one or more waveform parameters corresponding to the reflection based at least in part on the transmitted configuration information, the one or more modified waveform parameters comprising a deterministic slow-time pattern phase, a phase correction, a frequency offset correction, an assisting node reflection signature, a programmable weight to apply to the reflection, or a combination thereof.

Aspect 12: The method of aspect 11, further comprising: applying the one or more modified waveform parameters to the reflection per radar signal, per processing interval, or both.

Aspect 13: The method of any of aspects 9 through 12, wherein reflecting the reflection comprises: transmitting the reflection according to the configuration information.

Aspect 14: The method of any of aspects 9 through 13, wherein reflecting the reflection comprises: varying a width of a transmit beam associated with the reflection.

Aspect 15: The method of any of aspects 9 through 14 wherein the assisting node comprises an intelligent reflective surface, an analog repeater, a digital repeater, or a combination thereof.

Aspect 16: The method of any of aspects 9 through 15 wherein the configuration information comprises a target detection operation schedule corresponding to the one or more sets of radar signals, an azimuth angle associated with the target, an elevation angle associated with the target, a persistence time for a plurality of target detection operations, calibration information, location information of the assisting node, or a combination thereof.

Aspect 17: An apparatus for wireless communication at a UE, comprising a processor; memory coupled with the processor; and instructions stored in the memory and executable by the processor to cause the apparatus to perform a method of any of aspects 1 through 8.

Aspect 18: An apparatus for wireless communication at a UE, comprising at least one means for performing a method of any of aspects 1 through 8.

Aspect 19: A non-transitory computer-readable medium storing code for wireless communication at a UE, the code comprising instructions executable by a processor to perform a method of any of aspects 1 through 8.

Aspect 20: An apparatus for wireless communication at an assisting node, comprising a processor; memory coupled with the processor; and instructions stored in the memory and executable by the processor to cause the apparatus to perform a method of any of aspects 9 through 16.

Aspect 21: An apparatus for wireless communication at an assisting node, comprising at least one means for performing a method of any of aspects 9 through 16.

Aspect 22: A non-transitory computer-readable medium storing code for wireless communication at an assisting node, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
 receiving, from an assisting node, a control message indicating configuration information associated with a second reflection, by the assisting node, of a first reflection, by the assisting node, of one or more sets of radar signals transmitted from the first UE;

transmitting the one or more sets of radar signals toward the assisting node for the first reflection by the assisting node of the one or more sets of radar signals;

receiving, via the assisting node, the second reflection of the first reflection of the one or more sets of radar signals in accordance with the configuration information; and calculating location information for a target UE based at least in part on the second reflection of the first reflection of the one or more sets of radar signals and based at least in part on the configuration information, wherein the target UE is different from the first UE.

2. The method of claim 1, further comprising:

detecting one or more modified waveform parameters of the second reflection by the assisting node of the one or more sets of radar signals based at least in part on the configuration information; and classifying the target UE as non-line-of-sight based at least in part on the one or more modified waveform parameters.

3. The method of claim 2, wherein the one or more modified waveform parameters comprising a deterministic slow-time pattern phase, a phase correction, a frequency offset correction, an assisting node reflection signature, or a combination thereof.

4. The method of claim 2, wherein the configuration information comprises an indication of the one or more modified waveform parameters, wherein the detecting is based at least in part on the indication of the one or more modified waveform parameters.

5. The method of claim 1, further comprising:

determining location information of the assisting node based at least in part on receiving the location information of the assisting node, estimating the location information of the assisting node, or both; and classifying the target UE as non-line-of-sight based at least in part on the location information of the assisting node and a range of the target UE being greater than a threshold range.

6. The method of claim 1, wherein calculating the location information for the target UE comprises:

performing a beamforming operation to search for the target UE.

7. The method of claim 1, wherein calculating the location information for the target UE comprises:

performing a line-of-sight search to determine a direction of the assisting node;

performing a non-line-of-sight search according to the configuration information, wherein the non-line-of-sight search comprises varying a width of a transmit beam; and estimating a range of the target UE based at least in part on performing the line-of-sight search, the non-line-of-sight search, or both.

8. The method of claim 7, wherein the varying the width of the transmit beam comprises the first UE varying the width of the transmit beam, the assisting node varying the width of the transmit beam, or a combination thereof.

9. The method of claim 1 wherein the configuration information comprises a target detection operation schedule corresponding to the one or more sets of radar signals, an azimuth angle associated with the target UE, an elevation angle associated with the target UE, a persistence time for a plurality of target detection operations, calibration information, location information of the assisting node, or a combination thereof.

10. A method for wireless communication at an assisting node, comprising:

transmitting, to a user equipment (UE), a control message indicating configuration information associated with reflections, by the assisting node, of one or more sets of radar signals transmitted from the UE;

reflecting the one or more sets of radar signals transmitted from the UE towards a target; and reflecting a reflection of the one or more sets of radar signals from the target towards the UE according to the configuration information.

11. The method of claim 10, further comprising:

transmitting, to the UE, location information of the assisting node.

12. The method of claim 10, wherein reflecting the reflection comprises:

modifying one or more waveform parameters of the reflection based at least in part on the configuration information, the one or more waveform parameters comprising a deterministic slow-time pattern phase, a phase correction, a frequency offset correction, an assisting node reflection signature, a programmable weight to apply to the reflection, or a combination thereof.

13. The method of claim 12, further comprising:

applying the one or more waveform parameters to the reflection per radar signal, per processing interval, or both.

14. The method of claim 12, wherein the configuration information comprises an indication of the one or more modified waveform parameters.

15. The method of claim 10, wherein reflecting the reflection comprises:

transmitting the reflection according to the configuration information.

16. The method of claim 10, wherein reflecting the reflection comprises:

varying a width of a transmit beam associated with the reflection.

17. The method of claim 10 wherein the assisting node comprises an intelligent reflective surface, an analog repeater, a digital repeater, or a combination thereof.

18. The method of claim 10 wherein the configuration information comprises a target detection operation schedule corresponding to the one or more sets of radar signals, an azimuth angle associated with the target, an elevation angle associated with the target, a persistence time for a plurality of target detection operations, calibration information, location information of the assisting node, or a combination thereof.

19. An apparatus for wireless communication at a first user equipment (UE), comprising:

one or more processors;

one or more memories coupled with the one or more processors; and instructions stored in the one or more memories and executable by the one or more processors to cause the apparatus to:

receive, from an assisting node, a control message indicating configuration information associated with a second reflection, by the assisting node, of a first reflection, by the assisting node, of one or more sets of radar signals transmitted from the first UE;

transmit the one or more sets of radar signals toward the assisting node for the first reflection by the assisting node of the one or more sets of radar signals;

receive, via the assisting node, the second reflection of the first reflection of the one or more sets of radar signals in accordance with the configuration information; and calculate location information for a target UE based at least in part on the second reflection of the first reflection of the one or more sets of radar signals and based at least in part on the configuration information, wherein the target UE is different from the first UE.

20. The apparatus of claim 19, wherein the instructions are further executable by the one or more processors to cause the apparatus to:

detect one or more modified waveform parameters of the second reflection by the assisting node of the one or more sets of radar signals based at least in part on the configuration information; and classify the target UE as non-line-of-sight based at least in part on the one or more modified waveform parameters.

21. The apparatus of claim 20, wherein the one or more modified waveform parameters comprising a deterministic slow-time pattern phase, a phase correction, a frequency offset correction, an assisting node reflection signature, or a combination thereof.

22. The apparatus of claim 19, wherein the instructions are further executable by the one or more processors to cause the apparatus to:

determine location information of the assisting node based at least in part on receiving the location information of the assisting node, estimating the location information of the assisting node, or both; and classify the target UE as non-line-of-sight based at least in part on the location information of the assisting node and a range of the target UE being greater than a threshold range.

23. The apparatus of claim 19, wherein the instructions to calculate the location information for the target UE are executable by the one or more processors to cause the apparatus to:

perform a beamforming operation to search for the target UE.

24. The apparatus of claim 19, wherein the instructions to calculate the location information for the target UE are executable by the one or more processors to cause the apparatus to:

perform a line-of-sight search to determine a direction of the assisting node;

perform a non-line-of-sight search according to the configuration information, wherein the non-line-of-sight search comprises varying a width of a transmit beam; and estimate a range of the target UE based at least in part on performing the line-of-sight search, the non-line-of-sight search, or both.

25. The apparatus of claim 24, wherein the varying the width of the transmit beam comprises the first UE varying the width of the transmit beam, the assisting node varying the width of the transmit beam, or a combination thereof.

26. An apparatus for wireless communication at an assisting node, comprising:

one or more processors;

one or more memories coupled with the one or more processors; and instructions stored in the one or more memories and executable by the one or more processors to cause the apparatus to:

transmit, to a user equipment (UE), a control message indicating configuration information associated with reflections, by the assisting node, of one or more sets of radar signals transmitted from the UE;

reflect the one or more sets of radar signals transmitted from the UE towards a target; and reflect a reflection of the one or more sets of radar signals from the target towards the UE according to the configuration information.

27. The apparatus of claim 26, wherein the instructions are further executable by the one or more processors to cause the apparatus to:

transmit, to the UE, location information of the assisting node.

28. The apparatus of claim 26, wherein the instructions to reflect the reflection are executable by the one or more processors to cause the apparatus to:

modify one or more waveform parameters corresponding to the reflection based at least in part on the configuration information, the one or more waveform parameters comprising a deterministic slow-time pattern phase, a phase correction, a frequency offset correction, an assisting node reflection signature, a programmable weight to apply to the reflection, or a combination thereof.

29. The apparatus of claim 28, wherein the instructions are further executable by the one or more processors to cause the apparatus to:

apply the one or more waveform parameters to the reflection per radar signal, per processing interval, or both.

30. The apparatus of claim 26, wherein the instructions to reflect the reflection are executable by the one or more processors to cause the apparatus to:

transmit the reflection according to the configuration information.

\* \* \* \* \*